United States Patent
Patterson

(10) Patent No.: US 9,361,331 B2
(45) Date of Patent: *Jun. 7, 2016

(54) MULTIPLE INDEX BASED INFORMATION RETRIEVAL SYSTEM

(71) Applicant: Google Inc., Mountain View, CA (US)

(72) Inventor: Anna L. Patterson, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/801,108

(22) Filed: Mar. 13, 2013

(65) Prior Publication Data

US 2014/0095511 A1   Apr. 3, 2014

Related U.S. Application Data

(60) Continuation of application No. 12/506,088, filed on Jul. 20, 2009, now Pat. No. 8,560,550, which is a division of application No. 11/043,695, filed on Jan. 25, 2005, now Pat. No. 7,567,959, which is a continuation-in-part of application No. 10/900,021, filed on Jul. 26, 2004, now Pat. No. 7,580,921.

(51) Int. Cl.
  *G06F 7/00* (2006.01)
  *G06F 17/30* (2006.01)

(52) U.S. Cl.
  CPC .... *G06F 17/30321* (2013.01); *G06F 17/30616* (2013.01); *G06F 17/30864* (2013.01); *Y10S 707/99933* (2013.01); *Y10S 707/99935* (2013.01)

(58) Field of Classification Search
  USPC ......... 707/709, 705, 706, 736, 741, 749, 748, 707/765
  See application file for complete search history.

(56) References Cited

U.S. PATENT DOCUMENTS

| | | | |
|---|---|---|---|
| 5,278,980 A | 1/1994 | Pedersen et al. |
| 5,321,833 A | 6/1994 | Chang et al. |
| 5,495,567 A | 2/1996 | Iizawa et al. |
| 5,523,946 A | 6/1996 | Kaplan et al. |
| 5,659,732 A | 8/1997 | Kirsch |
| 5,668,987 A | 9/1997 | Schneider |
| 5,694,593 A | 12/1997 | Baclawski |

(Continued)

FOREIGN PATENT DOCUMENTS

| | | |
|---|---|---|
| EP | 1622055 A1 | 2/2006 |
| JP | 2-270067 A | 11/1990 |

(Continued)

OTHER PUBLICATIONS

Examination Notification under Article 94(3) received for European Patent Application No. 08799272.3, mailed on Jan. 2, 2013, 8 pages.

(Continued)

*Primary Examiner* — Hung T Vy

(57) ABSTRACT

An information retrieval system uses phrases to index, retrieve, organize and describe documents. Phrases are identified that predict the presence of other phrases in documents. Documents are the indexed according to their included phrases. The document index is partitioned into multiple indexes, including a primary index and a secondary index. The primary index stores phrase posting lists with relevance rank ordered documents. The secondary index stores excess documents from the posting lists in document order.

15 Claims, 7 Drawing Sheets

(56) References Cited

U.S. PATENT DOCUMENTS

| | | | |
|---|---|---|---|
| 5,696,962 A | 12/1997 | Kupiec | |
| 5,715,443 A | 2/1998 | Yanagihara et al. | |
| 5,721,897 A | 2/1998 | Rubinstein | |
| 5,724,571 A | 3/1998 | Woods | |
| 5,734,749 A | 3/1998 | Yamada et al. | |
| 5,754,939 A | 5/1998 | Herz et al. | |
| 5,757,917 A | 5/1998 | Rose et al. | |
| 5,771,378 A | 6/1998 | Holt et al. | |
| 5,826,261 A | 10/1998 | Spencer | |
| 5,832,470 A | 11/1998 | Morita et al. | |
| 5,835,087 A | 11/1998 | Herz et al. | |
| 5,845,278 A | 12/1998 | Kirsch et al. | |
| 5,915,249 A | 6/1999 | Spencer | |
| 5,920,854 A | 7/1999 | Kirsch et al. | |
| 5,956,722 A | 9/1999 | Jacobson et al. | |
| 5,960,383 A | 9/1999 | Fleischer | |
| 5,983,216 A | 11/1999 | Kirsch et al. | |
| 6,018,733 A | 1/2000 | Kirsch et al. | |
| 6,070,158 A * | 5/2000 | Kirsch et al. | |
| 6,085,186 A | 7/2000 | Christianson et al. | |
| 6,098,034 A | 8/2000 | Razin et al. | |
| 6,178,419 B1 | 1/2001 | Legh-Smith et al. | |
| 6,185,550 B1 | 2/2001 | Snow et al. | |
| 6,185,558 B1 | 2/2001 | Bowman et al. | |
| 6,298,344 B1 | 10/2001 | Inaba et al. | |
| 6,349,316 B2 | 2/2002 | Fein et al. | |
| 6,363,377 B1 | 3/2002 | Kravets et al. | |
| 6,366,911 B1 | 4/2002 | Christy | |
| 6,366,933 B1 | 4/2002 | Ball et al. | |
| 6,415,283 B1 | 7/2002 | Conklin | |
| 6,470,307 B1 | 10/2002 | Turney | |
| 6,499,030 B1 | 12/2002 | Igata | |
| 6,523,030 B1 * | 2/2003 | Horowitz | |
| 6,542,888 B2 | 4/2003 | Marques | |
| 6,549,895 B1 | 4/2003 | Lai | |
| 6,571,240 B1 | 5/2003 | Ho et al. | |
| 6,594,658 B2 | 7/2003 | Woods | |
| 6,596,030 B2 | 7/2003 | Ball et al. | |
| 6,606,639 B2 | 8/2003 | Jacobson et al. | |
| 6,638,314 B1 | 10/2003 | Meyerzon et al. | |
| 6,654,739 B1 | 11/2003 | Apte et al. | |
| 6,684,183 B1 | 1/2004 | Korall et al. | |
| 6,691,106 B1 | 2/2004 | Sathyanarayan | |
| 6,697,793 B2 | 2/2004 | McGreevy | |
| 6,721,728 B2 | 4/2004 | McGreevy | |
| 6,741,981 B2 | 5/2004 | McGreevy | |
| 6,741,982 B2 | 5/2004 | Soderstrom et al. | |
| 6,741,984 B2 | 5/2004 | Zaiken et al. | |
| 6,751,612 B1 | 6/2004 | Schuetze et al. | |
| 6,769,016 B2 | 7/2004 | Rothwell et al. | |
| 6,772,150 B1 | 8/2004 | Whitman et al. | |
| 6,778,979 B2 | 8/2004 | Grefenstette et al. | |
| 6,778,980 B1 | 8/2004 | Madan et al. | |
| 6,785,671 B1 * | 8/2004 | Bailey et al. | 705/26.81 |
| 6,820,237 B1 | 11/2004 | Abu-Hakima et al. | |
| 6,823,333 B2 | 11/2004 | McGreevy | |
| 6,832,224 B2 | 12/2004 | Gilmour | |
| 6,839,682 B1 | 1/2005 | Blume et al. | |
| 6,859,800 B1 | 2/2005 | Roche et al. | |
| 6,862,710 B1 | 3/2005 | Marchisio | |
| 6,886,010 B2 | 4/2005 | Kostoff | |
| 6,910,003 B1 | 6/2005 | Arnold et al. | |
| 6,947,923 B2 | 9/2005 | Cha et al. | |
| 6,947,930 B2 | 9/2005 | Anick et al. | |
| 6,963,867 B2 | 11/2005 | Ford et al. | |
| 6,978,274 B1 | 12/2005 | Gallivan et al. | |
| 6,981,040 B1 | 12/2005 | Konig et al. | |
| 6,983,345 B2 | 1/2006 | Lapir et al. | |
| 6,997,793 B1 | 2/2006 | Ito | |
| 7,017,114 B2 | 3/2006 | Guo et al. | |
| 7,028,026 B1 | 4/2006 | Yang et al. | |
| 7,028,045 B2 | 4/2006 | Franz et al. | |
| 7,051,014 B2 | 5/2006 | Brill et al. | |
| 7,051,023 B2 | 5/2006 | Kapur et al. | |
| 7,051,024 B2 | 5/2006 | Fein et al. | |
| 7,058,589 B1 | 6/2006 | Leamon et al. | |
| 7,085,771 B2 | 8/2006 | Chung et al. | |
| 7,089,236 B1 | 8/2006 | Stibel | |
| 7,096,220 B1 | 8/2006 | Seibel et al. | |
| 7,130,790 B1 | 10/2006 | Flanagan et al. | |
| 7,137,062 B2 | 11/2006 | Kaufman et al. | |
| 7,137,065 B1 | 11/2006 | Huang et al. | |
| 7,139,756 B2 | 11/2006 | Cooper et al. | |
| 7,149,748 B1 | 12/2006 | Stephan | |
| 7,151,864 B2 | 12/2006 | Henry et al. | |
| 7,155,243 B2 | 12/2006 | Baldwin et al. | |
| 7,158,983 B2 | 1/2007 | Willse et al. | |
| 7,162,473 B2 | 1/2007 | Dumais et al. | |
| 7,171,619 B1 | 1/2007 | Bianco | |
| 7,194,483 B1 | 3/2007 | Mohan et al. | |
| 7,200,802 B2 | 4/2007 | Kawatani | |
| 7,206,389 B1 | 4/2007 | Dumoulin et al. | |
| 7,240,064 B2 * | 7/2007 | Risvik et al. | 707/709 |
| 7,243,092 B2 | 7/2007 | Woehler et al. | |
| 7,254,580 B1 | 8/2007 | Gharachorloo et al. | |
| 7,263,530 B2 | 8/2007 | Hu et al. | |
| 7,310,632 B2 | 12/2007 | Meek et al. | |
| 7,328,401 B2 | 2/2008 | Obata et al. | |
| 7,346,839 B2 | 3/2008 | Acharya et al. | |
| 7,356,527 B2 | 4/2008 | Carmel et al. | |
| 7,395,501 B2 | 7/2008 | Graham et al. | |
| 7,426,507 B1 | 9/2008 | Patterson | |
| 7,454,449 B2 | 11/2008 | Plow et al. | |
| 7,464,264 B2 | 12/2008 | Goodman et al. | |
| 7,483,820 B2 | 1/2009 | Yang | |
| 7,483,871 B2 | 1/2009 | Herz | |
| 7,536,408 B2 | 5/2009 | Patterson | |
| 7,562,066 B2 | 7/2009 | Kawatani | |
| 7,567,959 B2 | 7/2009 | Patterson | |
| 7,580,921 B2 | 8/2009 | Patterson | |
| 7,580,929 B2 | 8/2009 | Patterson | |
| 7,584,175 B2 | 9/2009 | Patterson | |
| 7,599,914 B2 | 10/2009 | Patterson | |
| 7,603,345 B2 | 10/2009 | Patterson | |
| 7,702,618 B1 | 4/2010 | Patterson | |
| 7,711,679 B2 | 5/2010 | Patterson | |
| 7,743,045 B2 | 6/2010 | Guha | |
| 8,042,112 B1 | 10/2011 | Zhu et al. | |
| 8,078,629 B2 | 12/2011 | Patterson | |
| 8,108,412 B2 | 1/2012 | Patterson | |
| 8,117,223 B2 | 2/2012 | Patterson | |
| 8,631,027 B2 | 1/2014 | Patterson | |
| 2001/0000356 A1 | 4/2001 | Woods | |
| 2001/0021938 A1 | 9/2001 | Fein et al. | |
| 2002/0042707 A1 | 4/2002 | Zhao et al. | |
| 2002/0042793 A1 | 4/2002 | Choi | |
| 2002/0046018 A1 | 4/2002 | Marcu et al. | |
| 2002/0046081 A1 | 4/2002 | Albazz et al. | |
| 2002/0052901 A1 | 5/2002 | Guo et al. | |
| 2002/0065857 A1 | 5/2002 | Michalewicz et al. | |
| 2002/0078090 A1 | 6/2002 | Hwang et al. | |
| 2002/0091671 A1 | 7/2002 | Prokoph | |
| 2002/0107844 A1 | 8/2002 | Cha et al. | |
| 2002/0138467 A1 | 9/2002 | Jacobson et al. | |
| 2002/0143524 A1 | 10/2002 | O'Neil et al. | |
| 2002/0147578 A1 | 10/2002 | O'Neil et al. | |
| 2002/0174113 A1 | 11/2002 | Kanie et al. | |
| 2002/0188587 A1 | 12/2002 | McGreevy | |
| 2002/0188599 A1 | 12/2002 | McGreevy | |
| 2003/0031996 A1 | 2/2003 | Robinson | |
| 2003/0037041 A1 | 2/2003 | Hertz | |
| 2003/0051214 A1 | 3/2003 | Graham et al. | |
| 2003/0069877 A1 | 4/2003 | Grefenstette et al. | |
| 2003/0078913 A1 | 4/2003 | McGreevy | |
| 2003/0093790 A1 | 5/2003 | Logan et al. | |
| 2003/0130993 A1 | 7/2003 | Mendelevitch et al. | |
| 2003/0140152 A1 * | 7/2003 | Creig Humes | 709/229 |
| 2003/0140309 A1 | 7/2003 | Saito et al. | |
| 2003/0144995 A1 | 7/2003 | Franz et al. | |
| 2003/0195877 A1 | 10/2003 | Ford et al. | |
| 2003/0195937 A1 | 10/2003 | Kircher et al. | |
| 2004/0006736 A1 | 1/2004 | Kawatani | |
| 2004/0034633 A1 | 2/2004 | Rickard | |
| 2004/0052433 A1 | 3/2004 | Henry et al. | |

(56) References Cited

U.S. PATENT DOCUMENTS

| | | |
|---|---|---|
| 2004/0064438 A1 | 4/2004 | Kostoff |
| 2004/0064442 A1 | 4/2004 | Popovitch |
| 2004/0068396 A1 | 4/2004 | Kawatani |
| 2004/0133560 A1 | 7/2004 | Simske |
| 2004/0148330 A1 | 7/2004 | Alspector et al. |
| 2004/0153456 A1 | 8/2004 | Charnock et al. |
| 2004/0158580 A1 | 8/2004 | Carmel et al. |
| 2004/0186824 A1 | 9/2004 | Delic et al. |
| 2004/0186827 A1 | 9/2004 | Anick et al. |
| 2004/0225667 A1 | 11/2004 | Hu et al. |
| 2004/0236736 A1 | 11/2004 | Whitman et al. |
| 2004/0243557 A1* | 12/2004 | Broder et al. ............... 707/3 |
| 2004/0260692 A1 | 12/2004 | Brill et al. |
| 2005/0043015 A1 | 2/2005 | Muramatsu |
| 2005/0043940 A1 | 2/2005 | Elder |
| 2005/0060295 A1 | 3/2005 | Gould et al. |
| 2005/0060651 A1 | 3/2005 | Anderson |
| 2005/0071310 A1 | 3/2005 | Eiron et al. |
| 2005/0071328 A1 | 3/2005 | Lawrence |
| 2005/0076084 A1 | 4/2005 | Loughmiller et al. |
| 2005/0086583 A1 | 4/2005 | Obata et al. |
| 2005/0154723 A1 | 7/2005 | Liang |
| 2005/0165778 A1 | 7/2005 | Obata et al. |
| 2005/0192936 A1 | 9/2005 | Meek et al. |
| 2005/0198559 A1 | 9/2005 | Fujiwara |
| 2005/0216564 A1 | 9/2005 | Myers et al. |
| 2005/0256848 A1 | 11/2005 | Alpert et al. |
| 2005/0278620 A1 | 12/2005 | Baldwin et al. |
| 2006/0018551 A1 | 1/2006 | Patterson |
| 2006/0020571 A1 | 1/2006 | Patterson |
| 2006/0020607 A1 | 1/2006 | Patterson |
| 2006/0031195 A1 | 2/2006 | Patterson |
| 2006/0036593 A1 | 2/2006 | Dean et al. |
| 2006/0041521 A1 | 2/2006 | Oral et al. |
| 2006/0053157 A1 | 3/2006 | Pitts |
| 2006/0106792 A1 | 5/2006 | Patterson |
| 2006/0143174 A1 | 6/2006 | Dey et al. |
| 2006/0143714 A1 | 6/2006 | Peterson et al. |
| 2006/0200464 A1 | 9/2006 | Gideoni et al. |
| 2006/0294124 A1 | 12/2006 | Cho |
| 2006/0294155 A1 | 12/2006 | Patterson |
| 2007/0011347 A1 | 1/2007 | George et al. |
| 2007/0055642 A1 | 3/2007 | Kim et al. |
| 2007/0239671 A1 | 10/2007 | Whitman et al. |
| 2007/0244884 A1 | 10/2007 | Yang |
| 2008/0005064 A1 | 1/2008 | Sarukkai |
| 2008/0195601 A1 | 8/2008 | Ntoulas et al. |
| 2008/0263202 A1 | 10/2008 | George et al. |
| 2008/0306943 A1 | 12/2008 | Patterson |
| 2008/0319971 A1 | 12/2008 | Patterson |
| 2009/0070312 A1 | 3/2009 | Patterson |
| 2010/0030773 A1 | 2/2010 | Patterson |
| 2010/0161625 A1 | 6/2010 | Patterson |
| 2010/0169305 A1 | 7/2010 | Patterson |
| 2010/0281535 A1 | 11/2010 | Perry et al. |
| 2011/0131223 A1 | 6/2011 | Patterson |
| 2012/0197885 A1 | 8/2012 | Patterson |
| 2012/0310902 A1 | 12/2012 | Patterson |
| 2014/0074809 A1 | 3/2014 | Patterson |
| 2014/0156647 A1 | 6/2014 | Patterson |

FOREIGN PATENT DOCUMENTS

| | | |
|---|---|---|
| JP | 8-249354 A | 9/1996 |
| JP | 10-207909 A | 8/1998 |
| JP | 11-293535 A | 10/1999 |
| JP | 2000-331032 A | 11/2000 |
| JP | 2002-132789 A | 5/2002 |
| JP | 2003-208433 A | 7/2003 |
| JP | 2003-281183 A | 10/2003 |
| JP | 2004-5600 A | 1/2004 |
| JP | 2004-46438 A | 2/2004 |
| JP | 2004-139150 A | 5/2004 |
| JP | 2004-192546 A | 7/2004 |
| JP | 2007-262217 A | 10/2007 |
| JP | 2008-305730 A | 12/2008 |
| KR | 2002-0045343 A | 6/2002 |
| WO | 97/38390 A2 | 10/1997 |
| WO | 01/42880 A2 | 6/2001 |
| WO | 2009/033098 A1 | 3/2009 |

OTHER PUBLICATIONS

Office Action Response filed for U.S. Appl. No. 12/506,088, filed on Jun. 14, 2012, 12 pages.
Office Action Response filed for U.S. Appl. No. 12/717,663, filed on Jul. 10, 2012, 19 pages.
Notice of Allowance received for U.S. Appl. No. 13/309,273, mailed on Mar. 19, 2013, 10 pages.
Office Action received for Canadian Application No. 2,595,674, mailed on Feb. 1, 2011, 2 pages.
Office Action received for Australian Patent Application No. 2008296071, mailed on Jun. 12, 2012, 2 pages.
Office Action Response filed for Chinese Patent Application No. 201110200364.0, filed on Aug. 27, 2012, 4 pages.
Office Action Response filed for Chinese Patent Application No. 201110198660.1, filed on Aug. 30, 2012, 36 pages (2 pages of English translation Amended Claims only and 34 pages of Official copy).
Office Action Response filed for Chinese Patent Application No. 201110200374.4, filed on Sep. 7, 2012, 38 pages (2 pages of English translation Amended Claims only and 36 pages of Official copy).
Office Action Response filed for Canadian Patent Application No. 2,513,851, filed on Jul. 12, 2012, 19 pages.
Office Action Response filed for Canadian Patent Application No. 2,513,852, filed on Jun. 12, 2012, 11 pages.
Office Action received for European Application No. 05254647.0, mailed on Sep. 17, 2010, 10 pages.
Office Action received for Chinese Patent Application No. 201110200364.0, issued on Jan. 21, 2013, 8 pages (5 pages of English Translation and 3 pages of Office Action).
Office Action received for Chinese Patent Application No. 201110200374.4, mailed on Jan. 15, 2013, 12 pages (7 pages of English translation and 5 pages of Official copy).
Office Action received for European Patent Application No. 052546462, mailed on Sep. 17, 2010, 5 pages.
Office Action Response filed for European Patent Application No. 05254646.2, filed on Jan. 27, 2011, 14 pages.
Office Action Response filed for European Patent Application No. 05254647.0, filed on Jan. 27, 2011, 15 pages.
Office Action received for European Patent Application No. 06719537.0, mailed on Feb. 9, 2012, 3 pgs.
Office Action Response filed for European Patent Application No. 06719537.0, filed on Mar. 6, 2012, 18 pages.
Extended European Search Report Response filed for European Patent Application No. 08799272.3, filed on Mar. 1, 2011, 12 pages.
Non Final Office Action Response filed for U.S. Appl. No. 11/851,962, filed on Mar. 14, 2011, 16 pages.
Non-Final Office Action received for U.S. Appl. No. 11/851,962, mailed on Nov. 12, 2010, 11 pages.
Notice of Allowance received for U.S. Appl. No. 11/851,962, mailed on Sep. 23, 2011, 6 pages.
Notice of Allowance received for U.S. Appl. No. 11/851,962, mailed on Jun. 6, 2011, 6 pages.
Notice of Allowance Response filed for U.S. Appl. No. 11/851,962, filed on Aug. 25, 2011, 12 pages.
Notice of Allowance received for U.S. Appl. No. 12/506,088, mailed on Nov. 18, 2011, 15 pages.
Notice of Allowance received for U.S. Appl. No. 12/506,088, mailed on Mar. 14, 2012, 12 pages.
Final Office Action Response filed for U.S. Appl. No. 12/578,339, filed on Jul. 15, 2011, 19 pages.
Final Office Action received for U.S. Appl. No. 12/578,339, mailed on Apr. 15, 2011, 12 pages.
Non Final Office Action received for U.S. Appl. No. 12/578,339, mailed on Sep. 17, 2010, 12 pages.

(56) References Cited

OTHER PUBLICATIONS

Non Final Office Action Response filed for U.S. Appl. No. 12/578,339, filed on Feb. 17, 2011, 10 pages.
Notice of Allowance received for U.S. Appl. No. 12/578,339, mailed on Jul. 27, 2011, 10 pages.
Final Office Action received for U.S. Appl. No. 12/717,663, mailed on Apr. 30, 2012, 26 pages.
Final Office Action Response filed for U.S. Appl. No. 12/717,663, filed on Jan. 9, 2012, 19 pages.
Final Office Action received for U.S. Appl. No. 12/717,663, mailed on Aug. 9, 2011, 15 pages.
Non Final Office Action received for U.S. Appl. No. 12/717,663, mailed on Jan. 5, 2011, 10 pages.
Non Final Office Action Response filed for U.S. Appl. No. 12/717,663, filed on Jun. 6, 2011, 16 pages.
Notice of Allowance received for U.S. Appl. No. 12/717,687, mailed on Sep. 22, 2011, 9 pages.
Final Office Action Response filed for U.S. Appl. No. 12/717,687, filed on Jul. 1, 2011, 12 pages.
Non Final Office Action received for U.S. Appl. No. 12/717,687, mailed on Jan. 5, 2011, 7 pages.
Office Action received for Canadian Patent Application No. 2,513,851, mailed on Jan. 12, 2012, 6 pages.
Office Action Response filed for Canadian Patent Application No. 2,513,851, filed on Mar. 14, 2011, 4 pages.
Office Action Response filed for Canadian Patent Application No. 2,513,851, filed on Sep. 14, 2011, 24 pages.
Office Action received for Canadian Patent Application No. 2,513,852, mailed on Dec. 12, 2011, 2 pages.
Office Action received for Canadian Patent Application No. 2,513,852, mailed on Oct. 20, 2010, 4 pages.
Office Action Response filed for Canadian Patent Application No. 2,595,674, filed on Jul. 29, 2011, 3 pages.
Office Action Response filed for Korean Patent Application No. 2005-0068056, filed on Jan. 12, 2012, 18 pages.
Office Action received for Korean Patent Application No. 2005-0068056, mailed on Jul. 13, 2011, 3 pages.
Office Action received for Chinese Patent Application No. 200510085371.5, mailed on Jan. 29, 2010, 9 pages (3 pages of English Translation and 6 pages of Office Action).
Office Action received for Chinese Patent Application No. 200510085371.5, mailed on Jan. 19, 2011, 4 pages (1 page of English Translation and 3 pages of Office Action).
Office Action received for Chinese Patent Application No. 200510085371.5, mailed on Mar. 1, 2010, 15 pages (9 pages of English Translation and 6 pages of Office Action).
Office Action Response filed for Chinese Patent Application No. 200510085371.5, filed on Mar. 21, 2011, 3 pages (1 page of English Translation and 2 pages of Office Action).
Office Action received for Japanese Patent Application No. P2005-216527, mailed on Nov. 9, 2010, 12 pages (6 pages of English Translation and of 6 pages of Office Action).
Office Action Response filed for Japanese Patent Application No. P2005-216527, filed on May 9, 2011, 34 pages (9 pages of English Translation and 25 pages of Office Action Response).
Office Action received for Japanese Patent Application No. P2005-216528, mailed on Nov. 2, 2010, 6 pages (3 pages of Office Action and 3 pages of Office Action).
Office Action Response filed for Japanese Patent Application No. P2005-216528, filed on May 2, 2011, 33 pages (8 pages of English Translation and 25 pages of Office Action Response).
Office Action Response filed for Japanese Patent Application No. 2005216529, filed on May 30, 2011, 41 pages (9 pages of English Translation and 32 pages of Office Action Response).
Office Action Response filed for Japanese Patent Application No. P2005-216530, filed on Nov. 30, 2010, 13 pages (6 pages of English Translation and 7 pages of Office Action Response).
Office Action received for Chinese Patent Application No. 200680007173.X, mailed on May 21, 2010, 17 pages (13 pages of English Translation and 4 pages of Office Action).
Office Action Response filed for Chinese Patent Application No. 20080105846A, filed on Feb. 1, 2012, 13 pages (8 pages of English Translation and 5 pages of Office Action Response).
Examiner's First Report received for Australian Patent Application No. 2010200478, mailed on Jul. 27, 2011, 1 page.
Office Action received for Chinese Patent Application No. 201110198660.1, mailed on Sep. 13, 2012, 3 pages.
Ahmed et al., "Word Stemming to Enhance Spam Filtering", http://www.ceas.cc/papers-2004/167.pdf, Proceedings of the First Conference on Email and Anti-Spam (CEAS) 2004, 2 pages.
Ahonen-Myka et al., "Finding Co-Occurring Text Phrases by Combining Sequence and Frequent Set Discovery", Proceedings of 16th International Joint Conference on Artificial Intelligence IJCAI-99 Workshop on Text Mining: Foundations Techniques and Applications, 10 pages.
Aizawa, Akiko, "An information-theoretic perspective of tf-idf measures", Information Processing and Management, vol. 39, 2003, pp. 45-65.
Lin et al., "An Automatic Indexing and Neural •Network Approach to Concept Retrieval and Classification of Multilingual (Chinese-English) Documents" IEEE Transactions on Systems, Man, and Cybernetics—Part B: vol. 26, No. 1, Feb. 1, 1996, pp. 75-88.
Jeong et al., "Inverted File Partitioning Schemes in Multiple Disk Systems", IEEE Transactions on Parallel and Distributed Systems, vol. 6, No. 2, Feb. 1995, pp. 142-153.
Office Action received for Canadian Patent Application No. 2,513,850, mailed on Oct. 7, 2010, 7 pages.
Notice of Allowance received for Canadian Application No. 2,513,852, mailed on Sep. 10, 2012, 1 page.
Office Action Response filed for Canadian Patent Application No. 2,513,853, filed Mar. 15, 2011, 84 pages.
Office Action received for Canadian Patent Application No. 2,595,674, mailed on Jun. 14, 2010, 3 pages.
Notice of Allowance received for Canadian Patent Application No. 2,513,853, mailed on May 2, 2012, 3 pages.
Caropreso et al., "Statistical Phrases in Automated Text Categorization", Internet Publication—Technical Report, available at http://dienst.isti.cnr.it/Dienst/Repository/2.0/Body/ercim.cnr.iei/2000-B4-0071, accessed on May 26, 2000, 18 pages.
Chang et al., "Performance and Implications of Semantic Indexing in a Distributed Environment", Proceedings of the 8th International Conference on Information Knowledge Management, 1999, pp. 391-398.
Chen et al., "Automatic Thesaurus Generation for an Electronic Community System", Journal of the American Society for Information Science, vol. 46, No. 3, 1995, pp. 175-193.
Chen et al., "Automatic Construction of Networks of Concepts Characterizing Document Databases", IEEE Transactions on Systems, Man, and Cybernetics, vol. 22, No. 5, Sep./Oct. 1992, pp. 885-902.
Chen et al., "Diverse Topic Phrase Extraction through Latent Semantic Analysis", Proceedings of the Sixth International Conference on Data Mining (ICDM'06), 2006, 5 pages.
Cheung et al., "An Efficient Algorithm for Incremental Update of Concept Spaces", Department of Computer Science and Information System, The University of Hong Kong Report, 2002, 16 pages.
Office Action received for Chinese Patent Application No. 200510085371.5, issued on Jun. 17, 2010, 6 pages (3 pages of English Translation and 3 pages of Office Action).
Office Action received for Chinese Patent Application No. 200880105846.4, issued on Aug. 1, 2011, 9 pages (4 pages of English Translation and 5 pages of Office Action).
Office Action received for Chinese Patent Application No. 201110198660.1, issued on Feb. 23, 2012, 8 pages (3 pages of English Translation and 5 pages of Office Action).
Office Action received for Chinese Patent Application No. 201110200364.0, issued on Feb. 23, 2012, 9 pages (6 pages of English Translation and 3 pages of Office Action).
Office Action received for Chinese Patent Application No. 201110200374.4, issued on Feb. 24, 2012, 6 pages (3 pages of English Translation and 3 pages of Office Action).
Office Action Response filed for European Patent Application No. 05254644.7 filed on Mar. 25, 2011, 7 pages.

(56) References Cited

OTHER PUBLICATIONS

Extended European Search Report received for European Patent Application No. 08799272.3, mailed on Aug. 18, 2010, 5 pages.
Fetterly et al., "Detecting Phrase-Level Duplication on the World Wide Web", Proceedings of the 28th annual International ACM SIGIR Conference on Research and Development in Information Retrieval (SIGIR), Aug. 15-19, 2005, pp. 170-177.
Garner et al., "Gene Alert—a Sequence Search Results Keyword Parser", IEEE Engineering in Medicine and Biology Magazine, vol. 17, No. 2, Mar.-Apr. 1998, pp. 119-122.
Gedeon et al., "Hierarchical Co-Occurrence Relations", IEEE International Conference on Systems, Man, and Cybernetics, vol. 3, Oct. 11-14, 1998, pp. 2750-2755.
Office Action received for European Application No. 06719537.0, mailed on Apr. 16, 2010, 6 pages.
House, David, "Save Web Time with WebSumm", vol. 1, No. 2, Jul. 1997, pp. 1-3.
Jagadeesh et al., "Sentence Extraction Based Single Document Summarization", International Institute of Information Technology, Hyderabad, India, Mar. 19-20, 2005, 5 pages.
Jing et al., "An Association Thesaurus for Information Retrieval", Proceedings of RIAO-94, 4th International Conference on Intelligent Multimedia Information Retrieval Systems and Management, Oct. 11-13, 1994, pp. 1-15.
Jones et al., "Topic-Based Browsing Within a Digital Library Using Keyphrases", Proceedings of the Fourth ACM conference on Digital Libraries, Aug. 11-14, 1999, 8 pages.
Jones et al., "Interactive Document Summarisation Using Automatically Extracted Keyphrases", Proceedings of the 35th Annual Hawaii International Conference on System Sciences, Jan. 7-10, 2002, pp. 1160-1169.
Notice of Allowance received for Japanese Patent Application Serial No. 2005-216527, mailed on Mar. 27, 2012, 3 pages (3 pages of Official copy).
Final Office Action received for Japanese Patent Application Serial No. 2005-216528, mailed on Mar. 27, 2012, 8 pages (4 pages of English translation and 4 pages of Official copy).
Notice of Allowance received for Japanese Patent Application Serial No. 2005-216529, mailed on Jan. 31, 2012, 3 pages (3 pages of Official copy).
Notice of Allowance received for Japanese Patent Application Serial No. 2005-216530, mailed on Jan. 31, 2012, 3 pages (3 pages of Official copy).
Notice of Allowance received for Japanese Patent Application Serial No. 2007-552403, mailed on Nov. 1, 2011, 3 pages (3 pages of Official copy).
Kando, Noriko, "Text Structure Analysis as a Tool to Make Retrieved Documents Usable", Proceedings of the 4th International Workshop on Information Retrieval with Asian Languages, Nov. 11-12, 1999, pp. 1-10.
Kataoka et al., "A System of Automatic Keywords Extraction and Related Data Collection for Japanese Text", Journal of Japan Society for Fuzzy Theory and Systems, vol. 9, No. 5, Oct. 15, 1997, pp. 710-717.
Office Action received for Korean Patent Application No. 10-2005-0068059, mailed on Oct. 26, 2011, 6 pages (3 pages of English translation and 3 pages of Official copy).
Notice of allowance received for Korean Patent Application No. 10-2005-0068056, mailed on May 21, 2012, 3 pages (1 page of English translation and 2 pages of Official copy).
Office Action Response filed for Korean Patent Application No. 10-2005-0068057, filed on Apr. 27, 2012, 16 pages.
Notice of Allowance received for Korean Patent Application No. 10-2005-0068057, mailed on Sep. 27, 2012, 3 pages (1 page of English translation and 2 pages of Official copy).
Office Action received for Korean Patent Application No. 10-2005-0068057, mailed on Oct. 27, 2011, 5 pages (2 pages of English translation and 3 pages of Official copy).
Office Action Response filed for Korean Patent Application No. 10-2005-0068058, filed on Feb. 21, 2012, 19 pages.
Office Action received for Korean Patent Application No. 10-2005-0068058, mailed on Aug. 23, 2011, 5 pages (2 pages of English translation and 3 pages of Official copy).
Office Action Response filed for Korean Patent Application No. 10-2005-0068059, filed on Apr. 26, 2012, 13 pages.
Notice of Allowance received for Korean Patent Application No. 10-2005-0068059, mailed on Sep. 26, 2012, 3 pages (1 page of English translation and 2 pages of Official copy).
Office Action received for Korean Patent Application No. 10-2007-7018720, mailed on May 1, 2012, 6 pages (3 pages of English translation and 3 pages of Official copy).
Ledeneva et al., "Terms Derived from Frequent Sequences for Extractive Text Summarization", Proceedings of the 9th international conference on Computational linguistics and intelligent text processing, Feb. 18, 2007, pp. 593-604.
Leng, I. Y. Y., "Topic Detection Using Maximal Frequent Sequences", Jan. 1, 2004, 95 pages.
Leroy et al., "Meeting Medical Terminology Needs—The Ontology-Enhanced Medical Concept Mapper", IEEE Transactions on Information Technology in Biomedicine, vol. 5, No. 4, Dec. 2001, pp. 261-270.
Office Action received for Norway Application No. 20053637, mailed on Jan. 16, 2013, 10 pages.
Mandala et al., "Combining Multiple Evidence From Different Types of Thesaurus for Query Expansion", Proceedings of SIGIR'99 22nd International Conference on Research and Development in Information Retrieval, (Association for Computing Machinery), Aug. 1999, pp. 191-197.
Nguyen et al., "Mining 'Hidden Phrase' Definitions from the Web", Proceedings of the 5th Asia-Pacific Web Conference on Web Technologies and Applications, Apr. 2003, pp. 156-165.
Ntoulas et al., "Detecting Spam Web Pages Through Content Analysis", Proceedings of the 15th International Conference on World Wide Web, May 23-26, 2006, pp. 83-92.
Pretschner et al., "Ontology Based Personalized Search", Proceedings of the 11th IEEE International Conference on Tools with Artificial Intelligence, Nov. 9, 1999, pp. 391-398.
Schutze et al., "A Cooccurrence-based Thesaurus and Two Applications to Information Retrieval", Information Processing & Management, vol. 33, No. 3, May 1997, pp. 307-318.
Srinivasan, P. "Optimal Document-Indexing Vocabulary for Medline", Information Processing & Management, vol. 32, No. 5, Sep. 1996, pp. 503-514.
Stanfill, C. "Partitioned Posting Files: A Parallel Inverted File Structure for Information Retrieval", SIGIR '90 Proceedings of the 13th Annual International ACM SIGIR Conference on Research and Development in Information Retrieval, Sep. 1990, pp. 413-428.
Stanfill et al., "Information Retrieval on The Connection Machine: 1 To 8192 Gigabytes", Information Processing and Management, vol. 27, No. 4, 1991, pp. 285-310.
Taniar et al., "A taxonomy of indexing schemes for parallel database systems", Distributed and Parallel Database, vol. 12, No. 1, Jul. 2002, pp. 73-106.
Tomasic et al., "Caching and Database Scaling in Distributed Shared-Nothing Information Retrieval Systems", Proceedings of SIGMOD, ACM, 1993, pp. 129-138.
Tomasic et al., "Performance of Inverted Indices in Shared-Nothing Distributed Text Document Information Retrieval Systems", IEEE, 1993, pp. 8-17.
Tomasic et al., "Query Processing and Inverted Indices in Shared-Nothing Text Document Information Retrieval Systems", VLDB Journal, vol. 2,1993, pp. 243-275.
Tomasic et al., "Performance of Inverted Indices in Distributed Text Document Retrieval Systems", Standford University Computer Science Technical Report STAN-CS-92/1434, Jun. 23, 1992, pp. 1-25.
Yap et al., "Topic Detection Using MFSs", IEA/AIE, 2006, pp. 342-352.
Yun et al., "Semantic-Based Information Retrieval for Content Management and Security", Computational Intelligence, vol. 19, No. 2, 2003, pp. 87-110.

(56) References Cited

OTHER PUBLICATIONS

Risvik et al., "Multi-Tier Architecture for Web Search Engines", Proceeding of 1st Latin American Web Congress, IEEE, Computer Society, Nov. 10-12, 2003, pp. 132-143.

Non-Final Office Action received for U.S. Appl. No. 13/347,467, mailed on Mar. 14, 2013, 7 pages.

Jones et al., "Interactive Document Summarisation Using Automatically Extracted Keyphrases", Proceedings of the 35th Hawaii International Conference on System Sciences, 2002, 10 pages.

Canadian Office Action received for Application No. 2,698,726, mailed on Feb. 23, 2016, 3 pages.

Norwegian Office Action received for Application No. 20074329, mailed on Feb. 29, 2016, 7 pages.

US 7,430,556, 09/2008, Patterson (withdrawn)

* cited by examiner

History and Origin of the Australian Shepherd

Despite it's name, the Australian Shepherd as we know it was developed in the United States. In the late 1800's, the forrunners of today's "Aussies" came to the western and northwestern states as stock dogs for the Basque shepherds that accompanied the vast numbers of sheep being imported from Australia. These hard working, medium sized, "little blue dogs" impressed the American ranchers.

The Australian Shepherd Club of America (ASCA) was formed in 1957 to promote the breed, and several clubs kept breed registries. A unified standard was adopted in 1976, and the registries combined in 1980. (National Stock Dog Registry keeps a separate Australian Shepherd registry.) ASCA has promoted the breed with conformation, stock-dog (herding), and obedience programs, and a recently formed rescue program. An excellent book about the breed is "All About Aussies" by Jeanne Joy Hartnagle.

FIG. 3

MULTIPLE INDEX BASED INFORMATION RETRIEVAL SYSTEM

CROSS REFERENCE TO RELATED APPLICATIONS

This application is a continuation of U.S. patent application Ser. No. 12/506,088, entitled "Multiple Index Based Information Retrieval System," and filed on Jul. 20, 2009, which is a divisional of U.S. patent application Ser. No. 11/043,695, now U.S. Pat. No. 7,567,959, filed on Jan. 25, 2005, which is a continuation-in-part of U.S. patent application Ser. No. 10/900,021, now U.S. Pat. No. 7,580,921, filed on Jul. 26, 2004. Each of the above-referenced applications is incorporated by reference herein in its entirety.

FIELD OF THE INVENTION

The present invention relates to an information retrieval system for indexing, searching, and classifying documents in a large scale corpus, such as the Internet.

BACKGROUND OF THE INVENTION

Information retrieval systems, generally called search engines, are now an essential tool for finding information in large scale, diverse, and growing corpuses such as the Internet. Generally, search engines create an index that relates documents (or "pages") to the individual words present in each document. A document is retrieved in response to a query containing a number of query terms, typically based on having some number of query terms present in the document. The retrieved documents are then ranked according to other statistical measures, such as frequency of occurrence of the query terms, host domain, link analysis, and the like. The retrieved documents are then presented to the user, typically in their ranked order, and without any further grouping or imposed hierarchy. In some cases, a selected portion of a text of a document is presented to provide the user with a glimpse of the document's content.

Direct "Boolean" matching of query terms has well known limitations, and in particular does not identify documents that do not have the query terms, but have related words. For example, in a typical Boolean system, a search on "Australian Shepherds" would not return documents about other herding dogs such as Border Collies that do not have the exact query terms. Rather, such a system is likely to also retrieve and highly rank documents that are about Australia (and have nothing to do with dogs), and documents about "shepherds" generally.

The problem here is that conventional systems index documents based on individual terms, rather than on concepts. Concepts are often expressed in phrases, such as "Australian Shepherd," "President of the United States," or "Sundance Film Festival". At best, some prior systems will index documents with respect to a predetermined and very limited set of 'known' phrases, which are typically selected by a human operator. Indexing of phrases is typically avoided because of the perceived computational and memory requirements to identify all possible phrases of say three, four, or five or more words. For example, on the assumption that any five words could constitute a phrase, and a large corpus would have at least 200,000 unique terms, there would approximately $3.2 \times 10^{26}$ possible phrases, clearly more than any existing system could store in memory or otherwise programmatically manipulate. A further problem is that phrases continually enter and leave the lexicon in terms of their usage, much more frequently than new individual words are invented. New phrases are always being generated, from sources such technology, arts, world events, and law. Other phrases will decline in usage over time.

Some existing information retrieval systems attempt to provide retrieval of concepts by using co-occurrence patterns of individual words. In these systems a search on one word, such as "President" will also retrieve documents that have other words that frequently appear with "President", such as "White" and "House." While this approach may produce search results having documents that are conceptually related at the level of individual words, it does not typically capture topical relationships that inhere between co-occurring phrases.

Accordingly, there is a need for an information retrieval system and methodology that can comprehensively identify phrases in a large scale corpus, index documents according to phrases, search and rank documents in accordance with their phrases, and provide additional clustering and descriptive information about the documents.

Another problem with conventional information retrieval systems is that they can only index a relatively small portion of the documents available on the Internet. It is currently estimated that there are over 200 billion pages on the Internet today. However, even the best search engines index only 6 to 8 billion pages, thereby missing the majority of available pages. There are several reasons for the limited indexing capability of existing systems. Most significantly, typical systems rely on a variation of an inverted index that maintains for every term (as discussed above) a list of every page on which the term occurs, along with position information identifying the exact position of each occurrence of the term on the page. The combination of indexing individual terms and indexing positional information requires a very large storage system.

A further problem with many information retrieval systems used for searching the Internet is their inability to archive pages that change over time. Conventionally, most Internet search engines only store the relevance information for a current instance (or version) of a given page, and update this information each time the page is re-indexed. As a result, a given search only returns the current versions of pages that satisfy the query. Users are unable as a result to search for prior instances of pages, or pages that were current in a specific date interval. Also, the search engines are likewise do not use version or date related relevance information when evaluating search queries or presenting search results.

Accordingly, it is desirable to provide an information retrieval system that can effectively index tens of billions, and eventually over 100 billion pages of content, without the substantial storage requirements of existing systems.

SUMMARY OF THE INVENTION

An information retrieval system and methodology uses phrases to index, search, rank, and describe documents in the document collection. The system is adapted to identify phrases that have sufficiently frequent and/or distinguished usage in the document collection to indicate that they are "valid" or "good" phrases. In this manner multiple word phrases, for example phrases of four, five, or more terms, can be identified. This avoids the problem of having to identify and index every possible phrases resulting from the all of the possible sequences of a given number of words.

The system is further adapted to identify phrases that are related to each other, based on a phrase's ability to predict the presence of other phrases in a document. More specifically, a prediction measure is used that relates the actual co-occurrence rate of two phrases to an expected co-occurrence rate of the two phrases. Information gain, as the ratio of actual co-occurrence rate to expected co-occurrence rate, is one such prediction measure. Two phrases are related where the prediction measure exceeds a predetermined threshold. In that case, the second phrase has significant information gain with respect to the first phrase. Semantically, related phrases will be those that are commonly used to discuss or describe a given topic or concept, such as "President of the United States" and "White House." For a given phrase, the related phrases can be ordered according to their relevance or significance based on their respective prediction measures.

An information retrieval system indexes documents in the document collection by the valid or good phrases. For each phrase, a posting list identifies the documents that contain the phrase. In addition, for a given phrase, a second list, vector, or other structure is used to store data indicating which of the related phrases of the given phrase are also present in each document containing the given phrase. In this manner, the system can readily identify not only which documents contain which phrases in response to a search query, but which documents also contain phrases that are related to query phrases, and thus more likely to be specifically about the topics or concepts expressed in the query phrases.

The information retrieval system is also adapted to use the phrases when searching for documents in response to a query. The query is processed to identify any phrases that are present in the query, so as to retrieve the associated posting lists for the query phrases, and the related phrase information. In addition, in some instances a user may enter an incomplete phrase in a search query, such as "President of the". Incomplete phrases such as these may be identified and replaced by a phrase extension, such as "President of the United States." This helps ensure that the user's most likely search is in fact executed.

Another aspect of the present invention is the capability to index an extremely large number of documents, on the order of one hundred billion or more, using a multiple index structure. In one embodiment, a primary and a secondary index are provided. The primary index stores index data for phrases, with a limited number of documents indexed for each phrase. For a particular phrase, the index data for the documents is stored in rank order of the documents' relevance to the phrase. This storage arrangement is preferably both logical and physical (i.e., how the data is stored on the underlying storage devices). Where more than the limited number of documents include a particular phrase, the index data for these remaining documents is stored in the secondary index, but here ordered by document number instead of relevance rank, and retrieved, for example, using scatter-gather type methods.

For example, the primary index may be structured to store 32 k document entries for each phrase, and the secondary index structured to store any further documents entries for further documents beyond the 32 k that contain the phrase. To obtain the document entries for the primary index, the documents are scored for relevance with respect to the phrase, and rank ordered by their relevance score. Alternatively, the documents may be rank ordered by various document features useful for relevance analysis. The rank ordering for the document entries is used partition the entries between the primary index and the secondary index. Where there are less than the limited number of documents that contain the phrase, then all of the entries are stored in the primary index, again in relevance rank order. The indexing arrangement enables a ten to fifteen-fold increase in storage capacity for the index, and because of the optimized index information, and a ten-fold increase in server performance.

Another aspect of the present invention is the capability to index multiple versions or instances of documents for archiving. This capability enables a user to search for documents within a specific range of dates, and enables date or version related relevance information to be used in evaluating documents in response to a search query and in organizing search results. In one embodiment, a document is associated with one or more date ranges. Each date range is associated with relevance data derived from the document and deemed valid for the document during the date range. A current date range is associated with a current instance of the document, from the date that the document was most recently indexed. When a document is encountered during an indexing pass, it is compared with a previous version to determine if the document has changed. If the document has not changed, then indexed relevance data is maintained. If the document has changed, then the current date range for the document is closed, and the document is re-indexed, and a new current date range is established, and associated with the current relevance data.

The present invention has further embodiments in system and software architectures, computer program products and computer implemented methods, and computer generated user interfaces and presentations.

The foregoing are just some of the features of an information retrieval system and methodology based on phrases. Those of skill in the art of information retrieval will appreciate the flexibility of generality of the phrase information allows for a large variety of uses and applications in indexing, document annotation, searching, ranking, and other areas of document analysis and processing.

BRIEF DESCRIPTION OF THE DRAWINGS

FIG. 3 illustrates a document with a phrase window and a secondary window.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

I. System Overview

Figure 1:
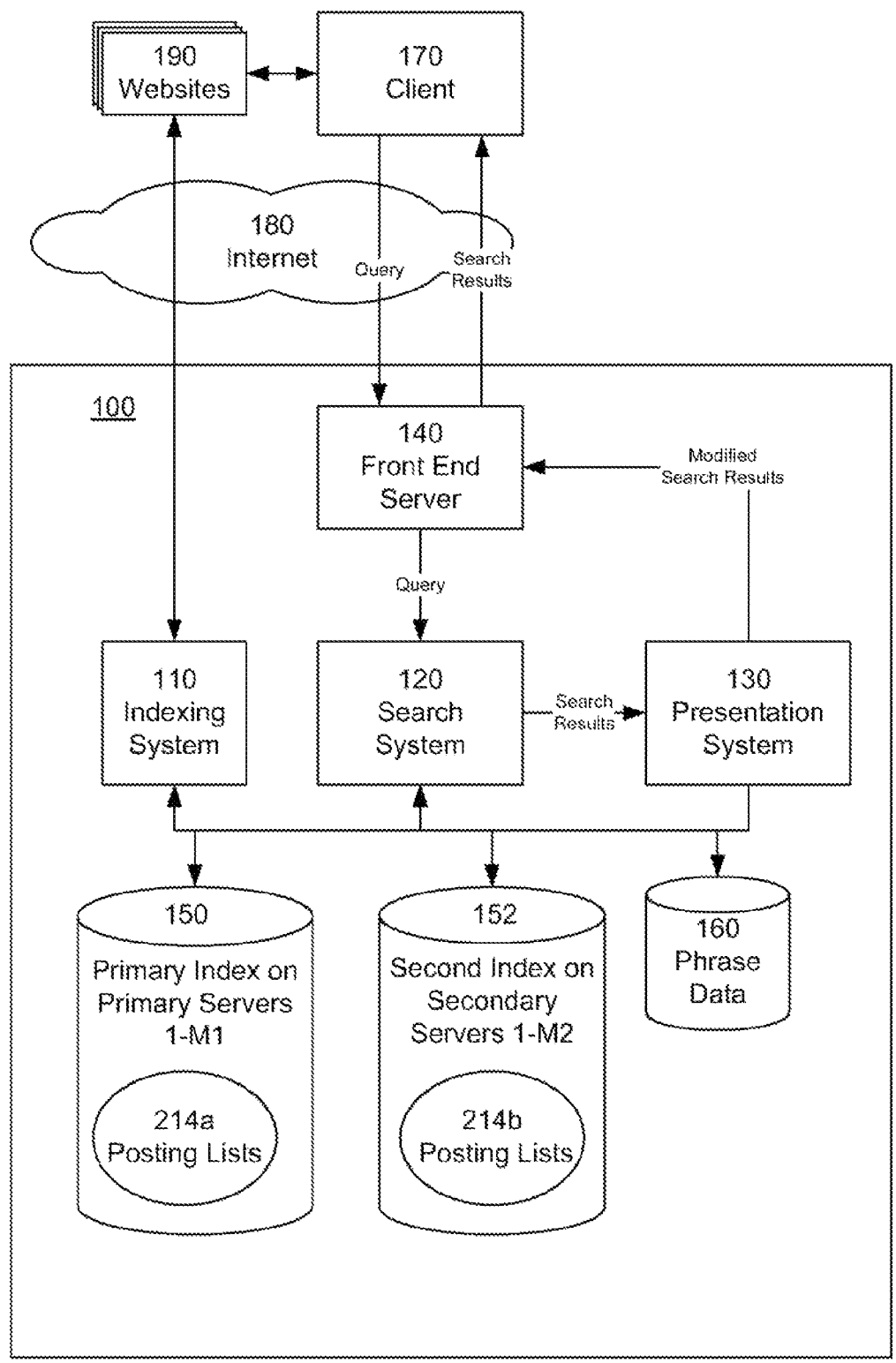
FIG. 1 is block diagram of the software architecture of one embodiment of the present invention.

Referring now to FIG. 1, there is shown the software architecture of an embodiment of a search system 100 in accordance with one embodiment of present invention. In this embodiment, the system includes a indexing system 110, a search system 120, a presentation system 130, and a front end server 140.

The indexing system 110 is responsible for identifying phrases in documents, and indexing documents according to their phrases, by accessing various websites 190 and other document collections. The front end server 140 receives queries from a user of a client 170, and provides those queries to the search system 120. The search system 120 is responsible for searching for documents relevant to the search query (search results), including identifying any phrases in the search query, and then ranking the documents in the search results using the presence of phrases to influence the ranking order. The search system 120 provides the search results to the presentation system 130. The presentation system 130 is responsible for modifying the search results including removing near duplicate documents, and generating topical descriptions of documents, and providing the modified search results back to the front end server 140, which provides the results to the client 170. The system 100 further includes a primary index 150 and a secondary index 152 that stores the indexing information pertaining to documents, and a phrase data store 160 that stores phrases, and related statistical information. The primary index 150 is distributed across a number of primary servers 1 . . . M1, and the secondary index 152 is likewise distributed across a number of secondary servers 1 . . . M2.

In the context of this application, "documents" are understood to be any type of media that can be indexed and retrieved by a search engine, including web documents, images, multimedia files, text documents, PDFs or other image formatted files, and so forth. A document may have one or more pages, partitions, segments or other components, as appropriate to its content and type. Equivalently a document may be referred to as a "page," as commonly used to refer to documents on the Internet. No limitation as to the scope of the invention is implied by the use of the generic term "documents." The search system 100 operates over a large corpus of documents, such as the Internet and World Wide Web, but can likewise be used in more limited collections, such as for the document collections of a library or private enterprises. In either context, it will be appreciated that the documents are typically distributed across many different computer systems and sites. Without loss of generality then, the documents generally, regardless of format or location (e.g., which website or database) will be collectively referred to as a corpus or document collection. Each document has an associated identifier that uniquely identifies the document; the identifier is preferably a URL, but other types of identifiers (e.g., document numbers) may be used as well. In this disclosure, the use of URLs to identify documents is assumed.

II. Indexing System

In one embodiment, the indexing system 110 provides three primary functional operations: 1) identification of phrases and related phrases, 2) indexing of documents with respect to phrases, and 3) generation and maintenance of a phrase-based taxonomy. Those of skill in the art will appreciate that the indexing system 110 will perform other functions as well in support of conventional indexing functions, and thus these other operations are not further described herein. The indexing system 110 operates on the primary index 150 and secondary index 152 and data repository 160 of phrase data. These data repositories are further described below.

1. Phrase Identification

The phrase identification operation of the indexing system 110 identifies "good" and "bad" phrases in the document collection that are useful to indexing and searching documents. In one aspect, good phrases are phrases that tend to occur in more than certain percentage of documents in the document collection, and/or are indicated as having a distinguished appearance in such documents, such as delimited by markup tags or other morphological, format, or grammatical markers. Another aspect of good phrases is that they are predictive of other good phrases, and are not merely sequences of words that appear in the lexicon. For example, the phrase "President of the United States" is a phrase that predicts other phrases such as "George Bush" and "Bill Clinton." However, other phrases are not predictive, such as "fell down the stairs" or "top of the morning," "out of the blue," since idioms and colloquisms like these tend to appear with many other different and unrelated phrases. Thus, the phrase identification phase determines which phrases are good phrases and which are bad (i.e., lacking in predictive power).

Figure 2:
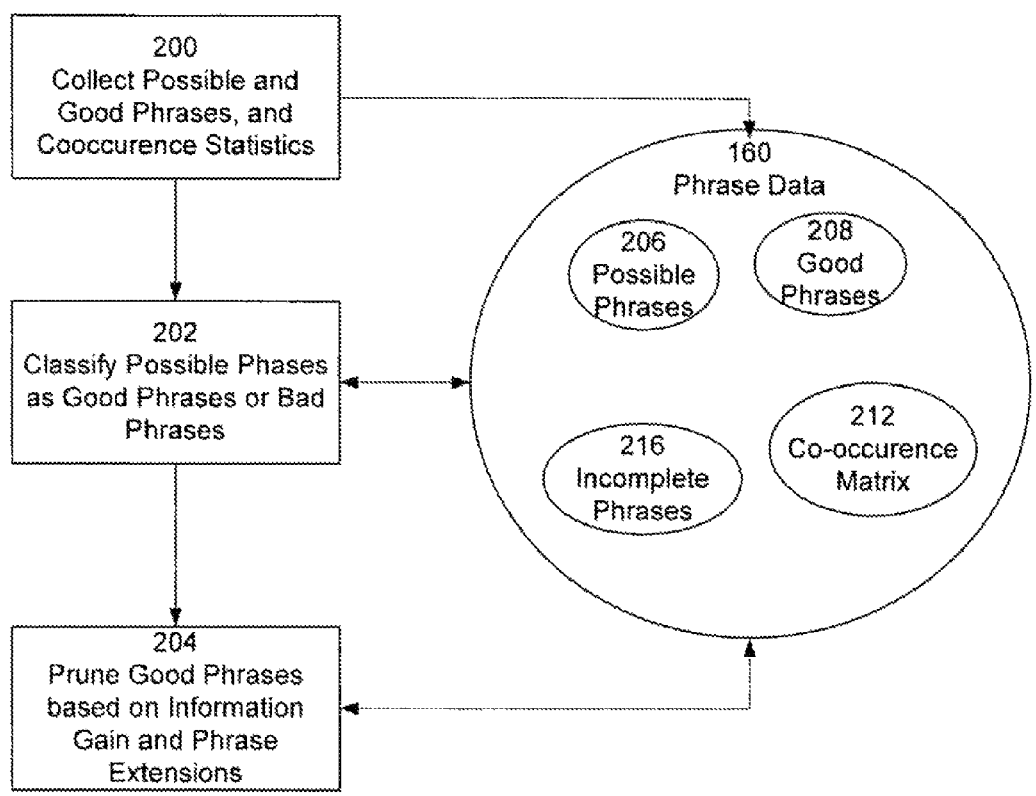
FIG. 2 illustrates a method of identifying phrases in documents.

Referring to now FIG. 2, the phrase identification process has the following functional stages:

200: Collect possible and good phrases, along with frequency and co-occurrence statistics of the phrases.

202: Classify possible phrases to either good or bad phrases based on frequency statistics.

204: Prune good phrase list based on a predictive measure derived from the co-occurrence statistics.

Each of these stages will now be described in further detail.

The first stage 200 is a process by which the indexing system 110 crawls a set of documents in the document collection, making repeated partitions of the document collection over time. One partition is processed per pass. The number of documents crawled per pass can vary, and is preferably about 1,000,000 per partition. It is preferred that only previously uncrawled documents are processed in each partition, until all documents have been processed, or some other termination criteria is met. In practice, the crawling continues as new documents are being continually added to the document collection. The following steps are taken by the indexing system 110 for each document that is crawled.

Traverse the words of the document with a phrase window length of n, where n is a desired maximum phrase length. The length of the window will typically be at least 2, and preferably 4 or 5 terms (words). Preferably phrases include all words in the phrase window, including what would otherwise be characterized as stop words, such as "a", "the," and so forth. A phrase window may be terminated by an end of line, a paragraph return, a markup tag, or other indicia of a change in content or format.

FIG. 3 illustrates a portion of a document 300 during a traversal, showing the phrase window 302 starting at the word "stock" and extending 5 words to the right. The first word in the window 302 is candidate phrase i, and the each of the sequences i+1, i+2, i+3, i+4, and i+5 is likewise a candidate phrase. Thus, in this example, the candidate phrases are: "stock", "stock dogs", "stock dogs for", "stock dogs for the", "stock dogs for the Basque", and "stock dogs for the Basque shepherds".

In each phrase window 302, each candidate phrase is checked in turn to determine if it is already present in the good phrase list 208 or the possible phrase list 206. If the candidate phrase is not present in either the good phrase list 208 or the possible phrase list 206, then the candidate has already been determined to be "bad" and is skipped.

If the candidate phrase is in the good phrase list 208, as entry $g_j$, then the index 150 entry for phrase $g_j$ is updated to include the document (e.g., its URL or other document identifier), to indicate that this candidate phrase $g_j$ appears in the current document. An entry in the index 150 for a phrase $g_j$ (or a term) is referred to as the posting list of the phrase $g_j$. The posting list includes a list of documents d (by their document identifiers, e.g. a document number, or alternatively a URL)

in which the phrase occurs. In one embodiment, the document number is derived by a one-way hash of the URL, using, for example, MD5.

In addition, the co-occurrence matrix 212 is updated, as further explained below. In the very first pass, the good and bad lists will be empty, and thus, most phrases will tend to be added to the possible phrase list 206.

If the candidate phrase is not in the good phrase list 208 then it is added to the possible phrase list 206, unless it is already present therein. Each entry p on the possible phrase list 206 has three associated counts:

P(p): Number of documents on which the possible phrase appears;

S(p): Number of all instances of the possible phrase; and

M(p): Number of interesting instances of the possible phrase. An instance of a possible phrase is "interesting" where the possible phrase is distinguished from neighboring content in the document by grammatical or format markers, for example by being in boldface, or underline, or as anchor text in a hyperlink, or in quotation marks. These (and other) distinguishing appearances are indicated by various HTML markup language tags and grammatical markers. These statistics are maintained for a phrase when it is placed on the good phrase list 208.

In addition the various lists, a co-occurrence matrix 212 (G) for the good phrases is maintained. The matrix G has a dimension of m×m, where m is the number of good phrases. Each entry G(j, k) in the matrix represents a pair of good phrases ($g_j$, $g_k$). The co-occurrence matrix 212 logically (though not necessarily physically) maintains three separate counts for each pair ($g_j$, $g_k$) of good phrases with respect to a secondary window 304 that is centered at the current word i, and extends +/−h words. In one embodiment, such as illustrated in FIG. 3, the secondary window 304 is 30 words. The co-occurrence matrix 212 thus maintains:

R(j,k): Raw Co-occurrence count. The number of times that phrase $g_j$ appears in a secondary window 304 with phrase $g_k$;

D(j,k): Disjunctive Interesting count. The number of times that either phrase $g_j$ or phrase $g_k$ appears as distinguished text in a secondary window; and C(j,k): Conjunctive Interesting count: the number of times that both $g_j$ and phrase $g_k$ appear as distinguished text in a secondary window. The use of the conjunctive interesting count is particularly beneficial to avoid the circumstance where a phrase (e.g., a copyright notice) appears frequently in sidebars, footers, or headers, and thus is not actually predictive of other text.

Referring to the example of FIG. 3, assume that the "stock dogs" is on the good phrase list 208, as well as the phrases "Australian Shepherd" and "Australian Shepard Club of America". Both of these latter phrases appear within the secondary window 304 around the current phrase "stock dogs". However, the phrase "Australian Shepherd Club of America" appears as anchor text for a hyperlink (indicated by the underline) to website. Thus the raw co-occurrence count for the pair {"stock dogs", "Australian Shepherd"} is incremented, and the raw occurrence count and the disjunctive interesting count for {"stock dogs", "Australian Shepherd Club of America"} are both incremented because the latter appears as distinguished text.

The process of traversing each document with both the sequence window 302 and the secondary window 304, is repeated for each document in the partition.

Once the documents in the partition have been traversed, the next stage of the indexing operation is to update 202 the good phrase list 208 from the possible phrase list 206. A possible phrase p on the possible phrase list 206 is moved to the good phrase list 208 if the frequency of appearance of the phrase and the number of documents that the phrase appears in indicates that it has sufficient usage as semantically meaningful phrase.

In one embodiment, this is tested as follows. A possible phrase p is removed from the possible phrase list 206 and placed on the good phrase list 208 if:

a) P(p)>10 and S(p)>20 (the number of documents containing phrase p is more than 10, and the number of occurrences of phrase p is more then 20); or b) M(p)>5 (the number of interesting instances of phrase p is more than 5).

These thresholds are scaled by the number of documents in the partition; for example if 2,000,000 documents are crawled in a partition, then the thresholds are approximately doubled. Of course, those of skill in the art will appreciate that the specific values of the thresholds, or the logic of testing them, can be varied as desired.

If a phrase p does not qualify for the good phrase list 208, then it is checked for qualification for being a bad phrase. A phrase p is a bad phrase if:

a) number of documents containing phrase, P(p)<2; and b) number of interesting instances of phrase, M(p)=0.

These conditions indicate that the phrase is both infrequent, and not used as indicative of significant content and again these thresholds may be scaled per number of documents in the partition.

It should be noted that the good phrase list 208 will naturally include individual words as phrases, in addition to multi-word phrases, as described above. This is because each the first word in the phrase window 302 is always a candidate phrase, and the appropriate instance counts will be accumulated. Thus, the indexing system 110 can automatically index both individual words (i.e., phrases with a single word) and multiple word phrases. The good phrase list 208 will also be considerably shorter than the theoretical maximum based on all possible combinations of m phrases. In typical embodiment, the good phrase list 208 will include about $6.5 \times 10^5$ phrases. A list of bad phrases is not necessary to store, as the system need only keep track of possible and good phrases.

By the final pass through the document collection, the list of possible phrases will be relatively short, due to the expected distribution of the use of phrases in a large corpus. Thus, if say by the $10^{th}$ pass (e.g., 10,000,000 documents), a phrase appears for the very first time, it is very unlikely to be a good phrase at that time. It may be new phrase just coming into usage, and thus during subsequent crawls becomes increasingly common. In that case, its respective counts will increases and may ultimately satisfy the thresholds for being a good phrase.

The third stage of the indexing operation is to prune 204 the good phrase list 208 using a predictive measure derived from the co-occurrence matrix 212. Without pruning, the good phrase list 208 is likely to include many phrases that while legitimately appearing in the lexicon, themselves do not sufficiently predict the presence of other phrases, or themselves are subsequences of longer phrases. Removing these weak good phrases results in a very robust likely of good phrases. To identify good phrases, a predictive measure is used which expresses the increased likelihood of one phrase appearing in a document given the presence of another phrase. This is done, in one embodiment, as follows:

As noted above, the co-occurrence matrix 212 is an m×m matrix of storing data associated with the good phrases. Each row j in the matrix represents a good phrase $g_j$ and each column k represented a good phrase $g_k$. For each good phrase $g_j$, an expected value $E(g_j)$ is computed. The expected value E is the percentage of documents in the collection expected to contain $g_j$. This is computed, for example, as the ratio of the number of documents containing $g_j$ to the total number T of documents in the collection that have been crawled: $P(j)/T$.

As noted above, the number of documents containing $g_j$ is updated each time $g_j$ appears in a document. The value for $E(g)$ can be updated each time the counts for $g_j$ are incremented, or during this third stage.

Next, for each other good phrase $g_k$ (e.g., the columns of the matrix), it is determined whether $g_j$ predicts $g_k$. A predictive measure for $g_j$ is determined as follows:

i) compute the expected value $E(g_k)$. The expected co-occurrence rate $E(j,k)$ of $g_j$ and $g_k$, if they were unrelated phrases is then $E(g)*E(g_k)$; ii) compute the actual co-occurrence rate $A(j,k)$ of $g_j$ and $g_k$. This is the raw co-occurrence count $R(j, k)$ divided by T, the total number of documents;

iii) $g_j$ is said to predict $g_k$ where the actual co-occurrence rate $A(j,k)$ exceeds the expected co-occurrence rate $E(j,k)$ by a threshold amount.

In one embodiment, the predictive measure is information gain. Thus, a phrase $g_j$ predicts another phrase $g_k$ when the information gain I of $g_k$ in the presence of $g_j$ exceeds a threshold. In one embodiment, this is computed as follows:

$$I(j,k)=A(j,k)/E(j,k)$$

And good phrase $g_j$ predicts good phrase $g_k$ where:

$$I(j,k) > \text{Information Gain threshold}.$$

In one embodiment, the information gain threshold is 1.5, but is preferably between 1.1 and 1.7. Raising the threshold over 1.0 serves to reduce the possibility that two otherwise unrelated phrases co-occur more than randomly predicted.

As noted the computation of information gain is repeated for each column k of the matrix G with respect to a given row j. Once a row is complete, if the information gain for none of the good phrases $g_k$ exceeds the information gain threshold, then this means that phrase $g_j$ does not predict any other good phrase. In that case, $g_j$ is removed from the good phrase list 208, essentially becoming a bad phrase. Note that the column j for the phrase $g_j$ is not removed, as this phrase itself may be predicted by other good phrases.

This step is concluded when all rows of the co-occurrence matrix 212 have been evaluated.

The final step of this stage is to prune the good phrase list 208 to remove incomplete phrases. An incomplete phrase is a phrase that only predicts its phrase extensions, and which starts at the left most side of the phrase (i.e., the beginning of the phrase). The "phrase extension" of phrase p is a supersequence that begins with phrase p. For example, the phrase "President of" predicts "President of the United States", "President of Mexico", "President of AT&T", etc. All of these latter phrases are phrase extensions of the phrase "President of" since they begin with "President of" and are super-sequences thereof.

Accordingly, each phrase $g_j$ remaining on the good phrase list 208 will predict some number of other phrases, based on the information gain threshold previously discussed. Now, for each phrase $g_j$ the indexing system 110 performs a string match with each of the phrases $g_k$ that is predicts. The string match tests whether each predicted phrase $g_k$ is a phrase extension of the phrase $g_j$. If all of the predicted phrases $g_k$ are phrase extensions of phrase $g_j$, then phrase $g_j$ is incomplete, and is removed from the good phrase list 208, and added to an incomplete phrase list 216. Thus, if there is at least one phrase $g_k$ that is not an extension of $g_j$, then $g_j$ is complete, and maintained in the good phrase list 208. For example then, "President of the United" is an incomplete phrase because the only other phrase that it predicts is "President of the United States" which is an extension of the phrase.

The incomplete phrase list 216 itself is very useful during actual searching. When a search query is received, it can be compared against the incomplete phase list 216. If the query (or a portion thereof) matches an entry in the list, then the search system 120 can lookup the most likely phrase extensions of the incomplete phrase (the phrase extension having the highest information gain given the incomplete phrase), and suggest this phrase extension to the user, or automatically search on the phrase extension. For example, if the search query is "President of the United," the search system 120 can automatically suggest to the user "President of the United States" as the search query.

After the last stage of the indexing process is completed, the good phrase list 208 will contain a large number of good phrases that have been discovered in the corpus. Each of these good phrases will predict at least one other phrase that is not a phrase extension of it. That is, each good phrase is used with sufficient frequency and independence to represent meaningful concepts or ideas expressed in the corpus. Unlike existing systems which use predetermined or hand selected phrases, the good phrase list reflects phrases that actual are being used in the corpus. Further, since the above process of crawling and indexing is repeated periodically as new documents are added to the document collection, the indexing system 110 automatically detects new phrases as they enter the lexicon.

2. Identification of Related Phrases and Clusters of Related Phrases

Figure 4:
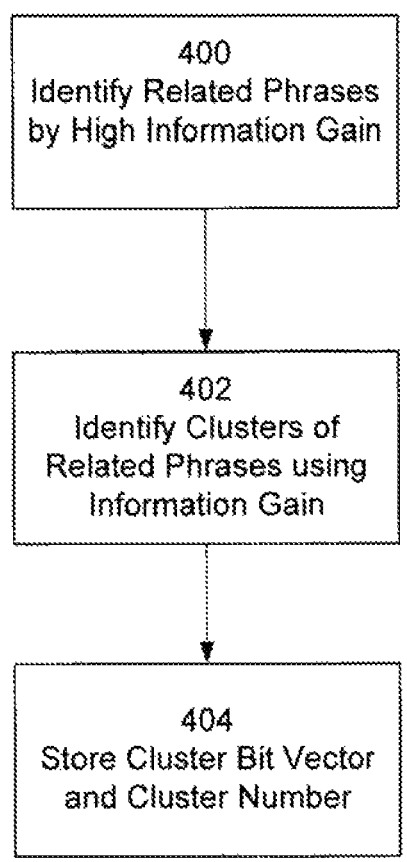
FIG. 4 illustrates a method of identifying related phrases.

Referring to FIG. 4, the related phrase identification process includes the following functional operations.

400: Identify related phrases having a high information gain value.

402: Identify clusters of related phrases.

404: Store cluster bit vector and cluster number.

Each of these operations is now described in detail.

First, recall that the co-occurrence matrix 212 contains good phrases each of which predicts at least one other good phrase $g_k$ with an information gain greater than the information gain threshold. To identify 400 related phrases then, for each pair of good phrases ($g_j$, $g_k$) the information gain is compared with a Related Phrase threshold, e.g., 100. That is, $g_j$ and $g_k$ are related phrases where:

$$I(g_j,g_k) > 100.$$

This high threshold is used to identify the co-occurrences of good phrases that are well beyond the statistically expected rates. Statistically, it means that phrases $g_j$ and $g_k$ co-occur 100 times more than the expected co-occurrence rate. For example, given the phrase "Monica Lewinsky" in a document, the phrase "Bill Clinton" is a 100 times more likely to appear in the same document, then the phrase "Bill Clinton" is likely to appear on any randomly selected document. Another way of saying this is that the accuracy of the predication is 99.999% because the occurrence rate is 100:1.

Accordingly, any entry ($g_j$, $g_k$) that is less the Related Phrase threshold is zeroed out, indicating that the phrases $g_j$, $g_k$ are not related. Any remaining entries in the co-occurrence matrix 212 now indicate all related phrases.

The columns $g_k$ in each row $g_j$ of the co-occurrence matrix 212 are then sorted by the information gain values $I(g_j, g_k)$, so that the related phrase $g_k$ with the highest information gain is listed first. This sorting thus identifies for a given phrase $g_j$, which other phrases are most likely related in terms of information gain.

The next step is to determine 402 which related phrases together form a cluster of related phrases. A cluster is a set of related phrases in which each phrase has high information gain with respect to at least one other phrase. In one embodiment, clusters are identified as follows.

In each row $g_j$ of the matrix, there will be one or more other phrases that are related to phrase $g_j$. This set is related phrase set $R_j$, where $R=\{g_k, g_l, \ldots g_m\}$.

For each related phrase m in $R_j$, the indexing system 110 determines if each of the other related phrases in R is also related to $g_j$. Thus, if $I(g_k, g_l)$ is also non-zero, then $g_j$, $g_k$, and $g_l$ are part of a cluster. This cluster test is repeated for each pair $(g_l, g_m)$ in R.

For example, assume the good phrase "Bill Clinton" is related to the phrases "President", "Monica Lewinsky", because the information gain of each of these phrases with respect to "Bill Clinton" exceeds the Related Phrase threshold. Further assume that the phrase "Monica Lewinsky" is related to the phrase "purse designer". These phrases then form the set R. To determine the clusters, the indexing system 110 evaluates the information gain of each of these phrases to the others by determining their corresponding information gains. Thus, the indexing system 110 determines the information gain I("President", "Monica Lewinsky"), I("President", "purse designer"), and so forth, for all pairs in R. In this example, "Bill Clinton," "President", and "Monica Lewinsky" form a one cluster, "Bill Clinton," and "President" form a second cluster, and "Monica Lewinsky" and "purse designer" form a third cluster, and "Monica Lewinsky", "Bill Clinton," and "purse designer" form a fourth cluster. This is because while "Bill Clinton" does not predict "purse designer" with sufficient information gain, "Monica Lewinsky" does predict both of these phrases.

To record 404 the cluster information, each cluster is assigned a unique cluster number (cluster ID). This information is then recorded in conjunction with each good phrase $g_j$.

In one embodiment, the cluster number is determined by a cluster bit vector that also indicates the orthogonality relationships between the phrases. The cluster bit vector is a sequence of bits of length n, the number of good phrases in the good phrase list 208. For a given good phrase $g_j$, the bit positions correspond to the sorted related phrases R of $g_j$. A bit is set if the related phrase $g_k$ in R is in the same cluster as phrase $g_j$. More generally, this means that the corresponding bit in the cluster bit vector is set if there is information gain in either direction between $g_j$ and $g_k$.

The cluster number then is the value of the bit string that results. This implementation has the property that related phrases that have multiple or one-way information gain appear in the same cluster.

An example of the cluster bit vectors are as follows, using the above phrases:

|  | Bill Clinton | President | Monica Lewinsky | purse designer | Cluster ID |
|---|---|---|---|---|---|
| Bill Clinton | 1 | 1 | 1 | 0 | 14 |
| President | 1 | 1 | 0 | 0 | 12 |
| Monica Lewinsky | 1 | 0 | 1 | 1 | 11 |
| purse designer | 0 | 0 | 1 | 1 | 3 |

To summarize then, after this process there will be identified for each good phrase $g_j$, a set of related phrases R, which are sorted in order of information gain $I(g_j, g_k)$ from highest to lowest. In addition, for each good phrase $g_j$, there will be a cluster bit vector, the value of which is a cluster number identifying the primary cluster of which the phrase $g_j$ is a member, and the orthogonality values (1 or 0 for each bit position) indicating which of the related phrases in R are in common clusters with $g_j$. Thus in the above example, "Bill Clinton", "President", and "Monica Lewinsky" are in cluster 14 based on the values of the bits in the row for phrase "Bill Clinton".

To store this information, two basic representations are available. First, as indicated above, the information may be stored in the co-occurrence matrix 212, wherein:

entry $G[\text{row } j, \text{col } k]=(I(j,k),\text{clusterNumber},\text{clusterBitVector})$ Alternatively, the matrix representation can be avoided, and all information stored in the good phrase list 208, wherein each row therein represents a good phrase $g_j$:

Phrase row$_j$=list[phrase $g_k$,$(I(j,k),\text{clusterNumber},\text{clusterBitVector})$].

This approach provides a useful organization for clusters. First, rather than a strictly—and often arbitrarily—defined hierarchy of topics and concepts, this approach recognizes that topics, as indicated by related phrases, form a complex graph of relationships, where some phrases are related to many other phrases, and some phrases have a more limited scope, and where the relationships can be mutual (each phrase predicts the other phrase) or one-directional (one phrase predicts the other, but not vice versa). The result is that clusters can be characterized "local" to each good phrase, and some clusters will then overlap by having one or more common related phrases.

For a given good phrase $g_j$ then the ordering of the related phrases by information gain provides a taxonomy for naming the clusters of the phrase: the cluster name is the name of the related phrase in the cluster having the highest information gain.

The above process provides a very robust way of identifying significant phrases that appear in the document collection, and beneficially, the way these related phrases are used together in natural "clusters" in actual practice. As a result, this data-driven clustering of related phrases avoids the biases that are inherent in any manually directed "editorial" selection of related terms and concepts, as is common in many systems.

3. Indexing Documents with Phrases and Related Phrases

Figure 5:
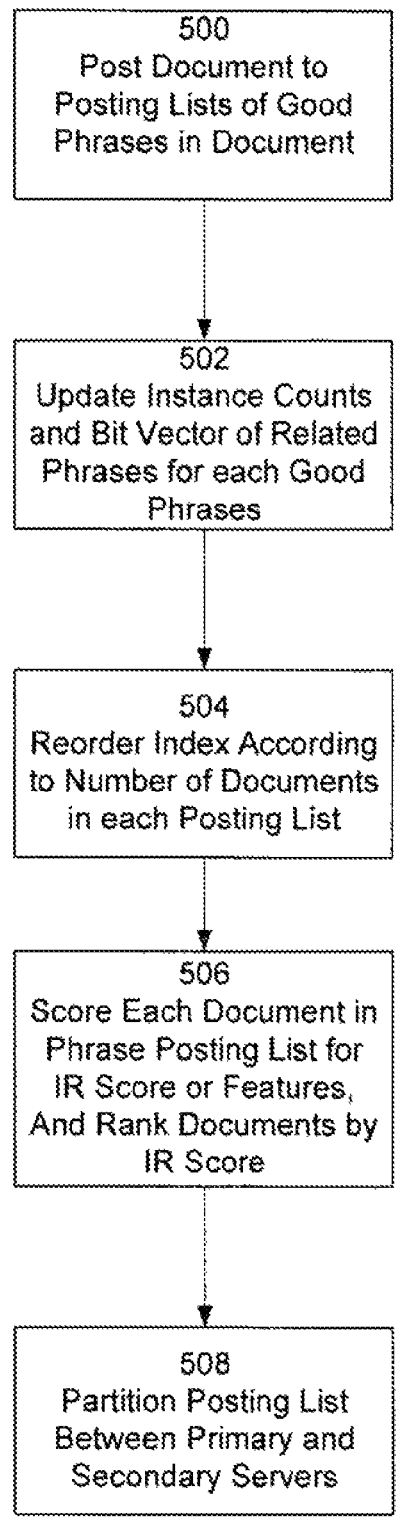
FIG. 5 illustrates a method of indexing documents for related phrases.

Given the good phrase list 208, including the information pertaining to related phrases and clusters, the next functional operation of the indexing system 110 is to index documents in the document collection with respect to the good phrases and clusters, and store the updated information in the primary index 150 and the secondary index 152. FIG. 5 illustrates this process, in which there are the following functional stages for indexing a document:

500: Post document to the posting lists of good phrases found in the document.

502: Update instance counts and related phrase bit vector for related phases and secondary related phrases.

504: Reorder index entries according to posting list size.

506: Rank index entries in each posting list by an information retrieval score or feature value.

508: Partition each posting list between the primary server 150 and a secondary server 152.

These stages are now described in further detail.

A set of documents is traversed or crawled, as before; this may be the same or a different set of documents. For a given document d, traverse 500 the document word by word with a sequence window 302 of length n, from position i, in the manner described above.

In a given phrase window 302, identify all good phrases in the window, starting at position i. Each good phrase is denoted as $g_i$. Thus, g1 is the first good phrase, g2 would be the second good phrase, and so forth.

For each good phrase $g_i$ (example g1 "President" and g4 "President of ATT") post the document identifier (e.g., the URL) to the posting list for the good phrase $g_i$ in the index 150. This update identifies that the good phrase $g_i$ appears in this specific document.

In one embodiment, the posting list for a phrase $g_j$ takes the following logical form:

Phrase $g_j$: list: (document d, [list: related phase counts] [related phrase information])

For each phrase $g_j$ there is a list of the documents d on which the phrase appears. For each document, there is a list of counts of the number of occurrences of the related phrases R of phrase $g_j$ that also appear in document d.

In one embodiment, the related phrase information is a related phase bit vector. This bit vector may be characterized as a "bi-bit" vector, in that for each related phrase $g_k$ there are two bit positions, $g_k$-1, $g_k$-2. The first bit position stores a flag indicating whether the related phrase $g_k$ is present in the document d (i.e., the count for $g_k$ in document d is greater than 0). The second bit position stores a flag that indicates whether a related phrase $g_l$ of $g_k$ is also present in document d. The related phrases $g_l$ of a related phrase $g_k$ of a phrase $g_j$ are herein called the "secondary related phrases of $g_j$." The counts and bit positions correspond to the canonical order of the phrases in R (sorted in order of decreasing information gain). This sort order has the effect of making the related phrase $g_k$ that is most highly predicted by $g_j$ associated with the most significant bit of the related phrase bit vector, and the related phrase $g_l$ that is least predicted by $g_j$ associated with the least significant bit.

It is useful to note that for a given phrase g, the length of the related phrase bit vector, and the association of the related phrases to the individual bits of the vector, will be the same with respect to all documents containing g. This implementation has the property of allowing the system to readily compare the related phrase bit vectors for any (or all) documents containing g, to see which documents have a given related phrase. This is beneficial for facilitating the search process to identify documents in response to a search query. Accordingly, a given document will appear in the posting lists of many different phrases, and in each such posting list, the related phrase vector for that document will be specific to the phrase that owns the posting list. This aspect preserves the locality of the related phrase bit vectors with respect to individual phrases and documents.

Accordingly, the next stage 502 includes traversing the secondary window 304 of the current index position in the document (as before a secondary window of +/−K terms, for example, 30 terms), for example from i−K to i+K. For each related phrase $g_k$ of $g_l$ that appears in the secondary window 304, the indexing system 110 increments the count of $g_k$ with respect to document d in the related phrase count. If $g_l$ appears later in the document, and the related phrase is found again within the later secondary window, again the count is incremented.

As noted, the corresponding first bit $g_k$-1 in the related phrase bit map is set based on the count, with the bit set to 1 if the count for $g_k$ is >0, or set to 0 if the count equals 0.

Next, the second bit, $g_k$-2 is set by looking up related phrase $g_k$ in the index 150, identifying in $g_k$'s posting list the entry for document d, and then checking the secondary related phrase counts (or bits) for $g_k$ for any its related phrases. If any of these secondary related phrases counts/bits are set, then this indicates that the secondary related phrases of $g_j$ are also present in document d.

When document d has been completely processed in this manner, the indexing system 110 will have identified the following:

i) each good phrase $g_j$ in document d;

ii) for each good phrase $g_j$ which of its related phrases $g_k$ are present in document d;

iii) for each related phrase $g_k$ present in document d, which of its related phrases $g_l$ (the secondary related phrases of $g_j$) are also present in document d.

a) Partitioned Indexing

Each phrase in the index 150 is given a phrase number, based on its frequency of occurrence in the corpus. The more common the phrase, the lower phrase number it receives in the index. The indexing system 110 then sorts 504 all of the posting lists 214a in the primary index 150 in declining order according to the number of documents listed in each posting list, so that the most frequently occurring phrases have the lowest phrase number and are listed first in the primary index 150. As noted above, the primary index 150 is distributed across M1 primary servers. To reduce disk contention, phrases are distributed across these machines by hash function, e.g., phrase_number MOD M1.

To significantly increase the number of documents that can be indexed by the system, the primary index 150 is further processed to selectively partition each of the posting lists 214a. As noted above, the posting list of each phrase contains a list of documents. Each document in the posting list is given 506 an information retrieval-type score with respect to the phrase. However the score is computed, the documents in the posting list are then ranked in declining order by this score, with the highest scoring documents listed first in the posting list. This pre-ranking of documents is particularly beneficial for improved performance when retrieving documents in response to a search query.

The scoring algorithm for pre-ranking the documents may be the same underlying relevance scoring algorithm used in the search system 120 to generate a relevance score. In one embodiment, the IR score is based on the page rank algorithm, as described in U.S. Pat. No. 6,285,999. Alternatively or additionally, statistics for a number of IR-relevant attributes of the document, such as the number of inlinks, outlinks, document length, may also be stored, and used alone or in combination in order to rank the documents. For example, the documents may be ranked in declining order according to the number of inlinks. To further facilitate the fastest possible retrieval of information from the primary index 150, the entries in each posting list 214a are physically stored on the appropriate primary server in the rank ordering by the IR-type score.

Given that the highest scoring documents for a given phrase are now at the beginning of the posting list, the posting list 214a is partitioned 508 between the primary index 150 and the secondary index 152. The posting list entries for up to the first K documents remain stored on the primary server 150, while the posting list entries for the remaining n>K documents are stored in the secondary index 152, and deleted from the end of the posting list 214a in the primary index 150. In one embodiment K is set to 32,768 (32 k), but a higher or lower value of K may be used. A phrase that has its posting list partitioned between the primary and the secondary index is called a 'common' phrase, whereas a phrase that is not partitioned is called a 'rare' phrase. The portion of a posting list stored in the primary index 150 is referred to as the primary posting list 214a and contains the primary entries, and portion of a posting list stored in the secondary index 152 is referred to as the secondary posting list 214b and contains the secondary entries. The secondary entries for a given posting list 214 are assigned to a secondary server according to another hash function of the phrase number, e.g., phrase number MOD M2. The secondary server ID is stored in the posting list m on the primary server, to allow the search system 120 to readily access the appropriate secondary server as needed. For each phrase posting list stored on one of the secondary servers, the secondary entries are stored physically in order of their document numbers, from lowest document number to highest (in contrast to the relevance ordering in the primary index 150). Preferably, no relevance information is stored in the secondary entries, so that the entries contain a minimal amount of data, such as the document number, and document locator (e.g., URL). The ranking and partitioning steps may be performed sequentially for each phrase; alternatively all (or a number of phrases can first be ranked, and then partitioned; the algorithm design is merely a design choice and the above variations are considered equivalents. The ranking and partitioning steps are conducted during each indexing pass over a set of documents, so that any phrases that are updated with new documents during an indexing pass are re-ranked and re-partitioned. Other optimizations and operations are also possible.

In one embodiment, the selection of document attributes that are stored in the primary index 150 for each document in the post listing 214a is variable, and in particular decreases towards the end of the posting list 214a in the primary index. In other words, documents that are highly ranked in the posting list based on their relevance score (or other relevance based attributes), will have all or most of the document attributes stored in the document entry in the posting list. Documents at near the end of the posting list 214a in the primary index will have only a more limited set of such attributes stored.

In one embodiment, each posting list 214a in the primary index 150 has three sections (or tiers), of lengths m, 3m, 5m, where m here is a number of document entries, In this embodiment, it is desirable that each section have length K, as described above, that is m=K, and the entire primary index has 9K entries; the secondary index would then store the secondary entries where n>9K.

In the first section (first m entries), the following relevance attributes are stored for each document entry in the posting list of a given phrase:
1. The document relevance score (e.g., page rank);
2. Total number of occurrences of the phrase in the document;
3. A rank ordered list of up to 10,000 anchor documents that also contain the phrase and which point to this document, and for each anchor document its relevance score (e.g., page rank), and the anchor text itself; and
4. The position of each phrase occurrence, and for each occurrence, a set of flags indicating whether the occurrence is a title, bold, a heading, in a URL, in the body, in a sidebar, in a footer, in an advertisement, capitalized, or in some other type of HTML markup.

In the second section (next 3m entries), only items 1-3 are stored.

In the third section (final 5m entries), only item 1 is stored.

Systematically reducing which document attributes are stored in later portions of each posting list 214a is acceptable because documents at near the end of the posting list are already determined to be less relevant to the particular phrase (lower relevance score), and so it is not entirely necessary to store all of their relevance characteristics.

The foregoing storage arrangement enables storing significantly more entries in a given amount of hard disk storage than conventional techniques. First, elimination of the term position information for every phrase in every document provides approximately a 50% reduction in the amount of storage needed for a given set of documents, thereby effectively doubling the number of documents that can be stored. Second, partitioning the posting lists between the primary index and secondary indices and storing relevance information only in the primary index provides further substantial savings. Many phrases have over 100,000, even 1,000,000 documents in their posting lists. Storing the relevance information for only a limited number of entries in the primary index eliminates the storage needed for the documents that are not likely to be returned in search. This aspect provides approximately a ten-fold increase in the number of documents that can be stored. Finally, further savings (approximately 25%-50% reduction in required storage capacity) are achieved by selectively storing less relevance information in the primary index 150 for the less relevant (lower ranked) documents in each posting list 214a.

b) Determining the Topics for a Document

The indexing of documents by phrases and use of the clustering information provides yet another advantage of the indexing system 110, which is the ability to determine the topics that a document is about based on the related phrase information.

Assume that for a given good phrase $g_j$ and a given document d, the posting list entry is as follows:

---

$g_j$: document d: related phrase counts:= {3,4,3,0,0,2,1,1,0}
related phrase bit vector:={ 11 11 10 00 00 10 10 10

--- where, the related phrase bit vector is shown in the bi-bit pairs.

From the related phrase bit vector, we can determine primary and secondary topics for the document d. A primary topic is indicated by a bit pair (1,1), and a secondary topic is indicated by a bit pair (1,0). A related phrase bit pair of (1,1) indicates that both the related phrase $g_k$ for the bit pair is present in document d, along the secondary related phrases $g_l$ as well. This may be interpreted to mean that the author of the document d used several related phrases $g_j$, $g_k$, and $g_l$ together in drafting the document. A bit pair of (1,0) indicates that both $g_j$ and $g_k$ are present, but no further secondary related phrases from $g_k$ are present, and thus this is a less significant topic.

c) Indexing Instances of Documents for Archival Retrieval

Another embodiment of the present invention allows the capability to store and maintain historical documents in the indices, and thereby enable archival retrieval of date specific instances (versions) of individual documents or pages. This capability has various beneficial uses, including enabling a user may search for documents within a specific range of dates, enabling the search system 120 to use date or version related relevance information in evaluating documents in response to a search query, and in organizing search results.

In this embodiment, the document identifier encodes the identity of the document with respect to a date interval. The first time a document is crawled by the indexing system 110, the document identifier is stored as a hash of the document URL and the date stamp of the document, for example, MD5 (URL, first date). Associated with the particular instance of the document is date range field, which comprises a range of dates for which the document instance is deemed to valid. The date range can be specified as a date pair comprising a first date on which the document is deemed valid (the indexing date) and a last date on which the document is deemed valid (e.g, Nov. 1, 2004; Dec. 15, 2004). Alternatively, the date range can be specified as a first date, and a number indicating a number of days following the first date (e.g., Nov. 1, 2004, 45). A date can be specified in any useful format, including date strings or day numbers. During the period in which the document is the currently valid document, the second value is a status flag or token (including a NULL value), indicating this state; this is called the current interval. For example, (Nov. 1, 2004, "open") indicates that the document is currently valid. This indicates that the document will satisfy search that includes a date limitation after the first date. Regardless of the particular implementation, the first date for a given date interval may be referred to as the "open date", and the last date for a given interval may be referred to as the "closed date".

During subsequent indexing passes by the indexing system 110, the indexing system 110 determines whether the document has changed. If there is no change in the document, then the indexing system 110 takes no further action with respect to document. If there has been a change in the document (thus a new instance or version of the document), then the indexing system 110 re-indexes the document. Upon re-indexing, the indexing system 110 closes the current interval, by changing the open status flag to the current date minus one day. For example, if the indexing system 110 indexes the document on Dec. 16, 2004 and determines that the document has changed, then current interval is closed as follows: (Nov. 1, 2004, Dec. 15, 2004), and a new current interval is created, e.g., (Dec. 16, 2004, "open"). The indexing system 110 maintains each of the date ranges for the document, along with corresponding indexed relevance data (e.g., phrases, relevance statistics, document inlinks, and so forth) for the date range. Thus, each date range and set of relevance data is associated with a particular instance or version of the document. For each of date interval for a given document, the indexing system maintains a unique document identifier, e.g., MD5 (URL, first date), so as to be able to retrieve the appropriate cached document instance. In an embodiment using the primary and secondary indexes, when an indexing pass is completed, the posting lists 214a in the primary index are rescored, re-ranked, and repartitioned.

The determination of whether a given document has changed since the last indexing pass may be made in any number of ways, including using statistical rules, grammatical rules, or similar heuristics. In one embodiment, the indexing system 110 uses the phrases of a document to determine if a document has changed. Each time a document is indexed, the top N topics are identified and maintained as a list in association with the date range information, for example, the top 20 topics for the date range (Nov. 4, 2004, Dec. 15, 2004). The topic list of instance being indexed is then compared with the topic list of a prior document instance, preferably the most recently closed date range. If more than M % of the topics have changed (e.g., 5%), then the document is deemed to have changed, and is re-indexed for all phrases. It should be noted that other methods of determining whether a document has changed may also be used, and that the use of phrase-based indexing is not required. For example, a set of statistical rules may be used based on changes in document length, changes in which terms are most frequent, changes in term frequency, changes in the amount of types of HTML markup, or other measures of document structure or content.

III. Search System

Figure 6:
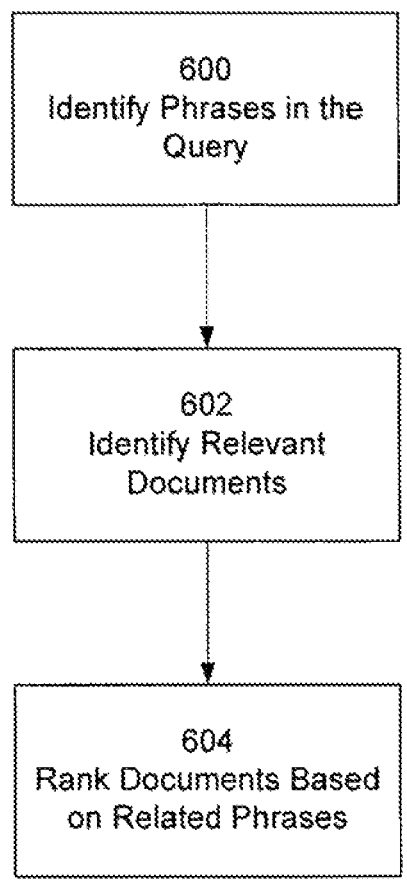
FIG. 6 illustrates a method of retrieving documents based on phrases.

The search system 120 operates to receive a query and search for documents relevant to the query, and provide a list of these documents (with links to the documents) in a set of search results. FIG. 6 illustrates the main functional operations of the search system 120:

600: Identify phrases in the query.
602: Retrieve documents relevant to query phrases.
604: Rank documents in search results according to phrases.

The details of each of these of these stages is as follows.
1. Identification of Phrases in the Query and Query Expansion The first stage 600 of the search system 120 is to identify any phrases that are present in the query in order to effectively search the index. The following terminology is used in this section:

q: a query as input and receive by the search system 120.
Qp: phrases present in the query.
Qr: related phrases of Qp.
Qe: phrase extensions of Qp.
Q: the union of Qp and Qr.

A query q is received from a client 190, having up to some maximum number of characters or words.

A phrase window of size N (e.g., 5) is used by the search system 120 to traverse the terms of the query q. The phrase window starts with the first term of the query, extends N terms to the right. This window is then shifted right M-N times, where M is the number of terms in the query.

At each window position, there will be N terms (or fewer) terms in the window. These terms constitute a possible query phrase. The possible phrase is looked up in the good phrase list 208 to determine if it is a good phrase or not. If the possible phrase is present in the good phrase list 208, then a phrase number is returned for phrase; the possible phrase is now a candidate phrase.

After all possible phrases in each window have been tested to determine if they are good candidate phrases, the search system 120 will have a set of phrase numbers for the corresponding phrases in the query. These phrase numbers are then sorted (declining order).

Starting with the highest phrase number as the first candidate phrase, the search system 120 determines if there is another candidate phrase within a fixed numerical distance within the sorted list, i.e., the difference between the phrase numbers is within a threshold amount, e.g. 20,000. If so, then the phrase that is leftmost in the query is selected as a valid query phrase Qp. This query phrase and all of its sub-phrases is removed from the list of candidates, and the list is resorted and the process repeated. The result of this process is a set of valid query phrases Qp.

For example, assume the search query is "Hillary Rodham Clinton Bill on the Senate Floor". The search system 120 would identify the following candidate phrases, "Hillary Rodham Clinton Bill on," "Hillary Rodham Clinton Bill," and "Hillary Rodham Clinton". The first two are discarded, and the last one is kept as a valid query phrase. Next the search system 120 would identify "Bill on the Senate Floor", and the subsphrases "Bill on the Senate", "Bill on the", "Bill on", "Bill", and would select "Bill" as a valid query phrase Qp. Finally, the search system 120 would parse "on the senate floor" and identify "Senate Floor" as a valid query phrase.

Next, the search system 120 adjusts the valid phrases Qp for capitalization. When parsing the query, the search system 120 identifies potential capitalizations in each valid phrase. This may be done using a table of known capitalizations, such as "united states" being capitalized as "United States", or by using a grammar based capitalization algorithm. This produces a set of properly capitalized query phrases.

The search system 120 then makes a second pass through the capitalized phrases, and selects only those phrases are leftmost and capitalized where both a phrase and its subphrase is present in the set. For example, a search on "president of the united states" will be capitalized as "President of the United States".

In the next stage, the search system 120 identifies 602 the documents that are relevant to the query phrases Q. The search system 120 then retrieves the posting lists of the query phrases Q, and where necessary, intersects these lists to determine which documents appear on the all (or some number) of the posting lists for the query phrases. If a phrase Q in the query has a set of phrase extensions Qe (as further explained below), then the search system 120 first forms the union of the posting lists of the phrase extensions, prior to doing the intersection with the posting lists. The search system 120 identifies phrase extensions by looking up each query phrase Q in the incomplete phrase list 216, as described above.

Using the primary index 150 and the secondary 150, the search system 120 can further optimize the intersection operation. There are four general cases of intersection analysis that the search system 120 has to handle based on whether the query phrases are common or rare.

The first case is for single query phrase, which can be either common or rare. In this case, the search system 120 passes a selected number (e.g., 100 or 1000) of the first entries in the phrase's posting list from the primary index 150 to the ranking phase 604 for final ranking. The ranking phase can optimize the ranking operation since the documents are already in rank order. Alternatively, since these are already pre-ranked by their relevance to the phrase, the set of documents can be directly provided as the search results, providing essentially instantaneous results to the user.

The second case is where there are two common query phrases. Here, the search system 120 accesses the posting lists 214a for each phrase in the primary index 150 and intersects these lists to form the final document list, which is then passed to the ranking phrase 604 for relevance scoring based on the set of relevance attributes associated with document. Because there are at least K documents in each posting list, there is a very high likelihood of a sufficient number documents containing both phrases, and thus intersection of the secondary entries in the secondary index 152 is not necessary. This further reduces the amount of time needed for retrieval.

The third case is where there are two rare query phrases. This case is treated in the same manner as the second care, since here the entire posting list for each phrase is stored in the primary index.

Figure 7:
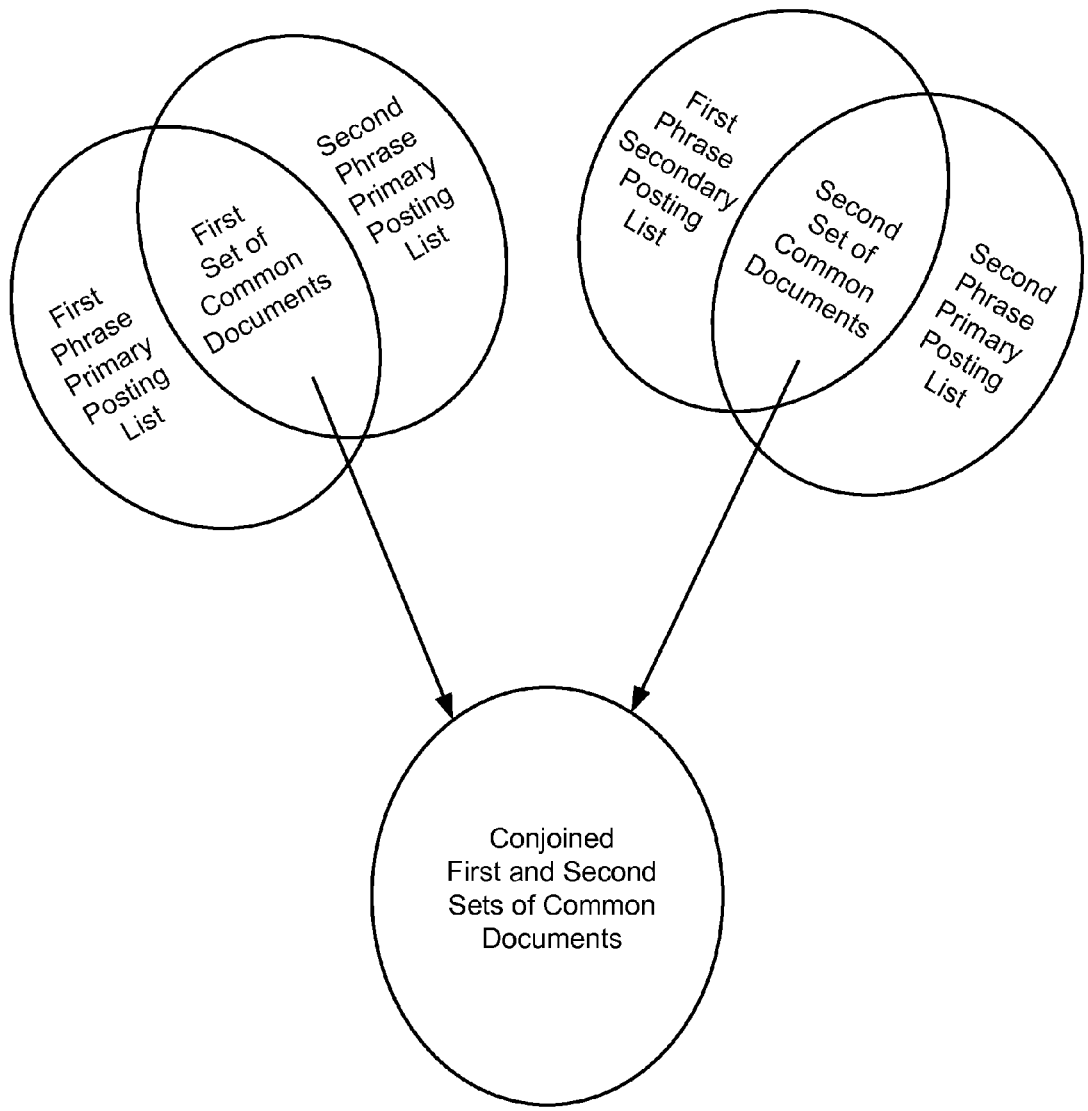
FIG. 7 illustrates the intersection of posting lists for a common phrase and a rare phrase of a search query.

The final case is where the valid query phrases comprise a common phrase and a rare phrase. In this case, the search system 120 first intersects the posting lists 214a from the primary index 150 for both phrases to form a first set or common documents. Next, the search system 120 intersects the posting list for the rare phrase with the secondary entries for the common phrase (which are already sorted in document number order) to form a second set of common documents. The two sets are conjoined and then passed to ranking phase. These actions are graphically represented in FIG. 7.

All instances where there are three or more query phrases can be reductively handled by one successive intersections using the above methods.

2. Ranking a) Ranking Documents Based on Contained Phrases

The search system 120 provides a ranking stage 604 in which the documents in the search results are ranked, using the relevance information and document attributes, along with the phrase information in each document's related phrase bit vector, and the cluster bit vector for the query phrases. This approach ranks documents according to the phrases that are contained in the document, or informally "body hits."

As described above, for any given phrase each document d in the $g_j$'s posting list has an associated related phrase bit vector that identifies which related phrases $g_k$ and which secondary related phrases $g_l$ are present in document d. The more related phrases and secondary related phrases present in a given document, the more bits that will be set in the document's related phrase bit vector for the given phrase. The more bits that are set, the greater the numerical value of the related phrase bit vector.

Accordingly, in one embodiment, the search system 120 sorts the documents in the search results according to the value of their related phrase bit vectors. The documents containing the most related phrases to the query phrases Q will have the highest valued related phrase bit vectors, and these documents will be the highest-ranking documents in the search results.

This approach is desirable because semantically, these documents are most topically relevant to the query phrases. Note that this approach provides highly relevant documents even if the documents do not contain a high frequency of the input query terms q, since related phrase information was used to both identify relevant documents, and then rank these documents. Documents with a low frequency of the input query terms may still have a large number of related phrases to the query terms and phrases and thus be more relevant than documents that have a high frequency of just the query terms and phrases but no related phrases.

In a second embodiment, the search system 120 scores each document in the result set according which related phrases of the query phrase Q it contains. This is done as follows:

Given each query phrase Q, there will be some number N of related phrases Qr to the query phrase, as identified during the phrase identification process. As described above, the related query phrases Qr are ordered according to their information gain from the query phrase Q. These related phrases are then assigned points, started with N points for the first related phrase Qr1 (i.e., the related phrase Qr with the highest information gain from Q), then N-1 points for the next related phrase Qr2, then N-2 points for Qr3, and so on, so that the last related phrase QrN is assigned 1 point.

Each document in the search results is then scored by determining which related phrases Qr of the query phrase Q are present, and giving the document the points assigned to each such related phrase Qr. The documents are then sorted from highest to lowest score.

As a further refinement, the search system 120 can cull certain documents from the result set. In some cases documents may be about many different topics; this is particularly the case for longer documents. In many cases, users prefer documents that are strongly on point with respect to a single topic expressed in the query over documents that are relevant to many different topics.

To cull these latter types of documents, the search system 120 uses the cluster information in the cluster bit vectors of the query phrases, and removes any document in which there are more than a threshold number of clusters in the document. For example, the search system 120 can remove any documents that contain more than two clusters. This cluster threshold can be predetermined, or set by the user as a search parameter.

b) Ranking Documents Based on Anchor Phrases

In addition to ranking the documents in the search results based on body hits of query phrases Q, in one embodiment, the search system 120 also ranks the documents based on the appearance of query phrases Q and related query phrases Qr in anchors to other documents. In one embodiment, the search system 120 calculates a score for each document that is a function (e.g., linear combination) of two scores, a body hit score and an anchor hit score.

For example, the document score for a given document can be calculated as follows:

Score=0.30*(body hit score)+0.70*(anchor hit score).

The weights of 0.30 and 0.70 can be adjusted as desired. The body hit score for a document is the numerical value of the highest valued related phrase bit vector for the document, given the query phrases Qp, in the manner described above. Alternatively, this value can directly obtained by the search system 120 by looking up each query phrase Q in the index 150, accessing the document from the posting list of the query phrase Q, and then accessing the related phrase bit vector.

The anchor hit score of a document d a function of the related phrase bit vectors of the query phrases Q, where Q is an anchor term in a document that references document d. When the indexing system 110 indexes the documents in the document collection, it maintains for each phrase a list of the documents in which the phrase is anchor text in an outlink, and also for each document a list of the inlinks (and the associated anchor text) from other documents. The inlinks for a document are references (e.g. hyperlinks) from other documents (referencing documents) to a given document.

To determine the anchor hit score for a given document d then, the search system 120 iterates over the set of referencing documents R (i=1 to number of referencing documents) listed in index by their anchor phrases Q, and sums the following product:

$R_i$·Q·Related phrase bit vector*D·Q·Related phrase bit vector.

The product value here is a score of how topical anchor phrase Q is to document D. This score is here called the "inbound score component." This product effectively weights the current document D's related bit vector by the related bit vectors of anchor phrases in the referencing document R. If the referencing documents R themselves are related to the query phrase Q (and thus, have a higher valued related phrase bit vector), then this increases the significance of the current document D score. The body hit score and the anchor hit score are then combined to create the document score, as described above.

Next, for each of the referencing documents R, the related phrase bit vector for each anchor phrase Q is obtained. This is a measure of how topical the anchor phrase Q is to the document R. This value is here called the outbound score component.

From the index 150 then, all of the (referencing document, referenced document) pairs are extracted for the anchor phrases Q. These pairs are then sorted by their associated (outbound score component, inbound score component) values. Depending on the implementation, either of these components can be the primary sort key, and the other can be the secondary sort key. The sorted results are then presented to the user. Sorting the documents on the outbound score component makes documents that have many related phrases to the query as anchor hits, rank most highly, thus representing these documents as "expert" documents. Sorting on the inbound document score makes documents that frequently referenced by the anchor terms the most high ranked.

c) Ranking Documents based on Date Range Relevance

The search system 120 can use the date range information in several ways during the search and ranking operations. First, the search system 120 can use the date range as an explicit search delimiter. For example may include terms or phrases and a date, such as "United States Patent and Trademark Office Dec. 4, 2004". The search system 120 can identify the date term, and then select documents that have the desired phrase and which are indexed for a date range that includes the date term in the query. From the selected documents, the search system 120 can then obtain relevance score for each document using the indexed relevance data associated with the date range. In this manner, an older or previous instance of document may be retrieved instead of the current instance where it is more relevant to the search query. This is particularly useful for documents and pages that change frequently, such as the home pages of news sites and other sites containing frequently changing information.

Second, where no date term is included in a search query, the search system 120 can use the date information in the index during relevance ranking, by weighting document relevance scores according to how old they are, so that older documents have their relevance scores down weighted (or newer documents are more highly weighted). Alternatively, in some cases, it is older versions of a document that are most relevant to a topic, rather than the most current version of a document. For example, news portal sites contemporaneously created at the time of historical events are likely to be more relevant to a specific query about the event, then current instances of the new portal. In this case, the search system 120 can upweight older document instances, where for example, the pattern of document relevance scores for all of the instances of a document shows an increase around some historical date, followed by decreasing relevance scores for more current instances of the document.

Where one or more date terms are included in the search query, as above, documents may have their relevance scores down weighted in proportion to the difference between the date term and the document date range, so that documents that are either much older than the date range (measured from either the open or the close date) or much newer than the desired date terms have their relevance scored down weighted. Conversely, a relevance score can be increased instead of down weighted where the date range for the document is closer to the desired date.

Third, the search system 120 can use the date range information as either a primary or secondary factor for ordering the search results. For examples, documents can be grouped in reversed chronological order (e.g. monthly groups), and within each group, the documents can be listed from most to least relevant to the search query.

Another use of the data range information is to rank documents based on the frequency with which they are updated. The search system 120 can determine the number of instances of a given document (e.g., number of discrete date ranges) over an interval of time (this count can be maintained during indexing). The number of instances is then used to upweight those documents which are more frequently updated.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer implemented method of indexing documents of a document collection, wherein each indexed document has a document identifier, the method comprising:
storing a posting list of identifiers of documents of the document collection that contain a phrase;
partitioning the posting list, by operation of at least one processor, into at least a first portion including identifiers of higher ranked documents and a second portion including identifiers of lesser ranked documents, the partitioning being based on a relevance score for a document identified in the posting list indicating the document's relevance to the phrase;
storing the first portion in a primary index; and
storing the second portion in a secondary index.

2. The method of claim 1, wherein the identifiers of the lesser ranked documents of the second portion being stored relative to one another in the secondary index in numerical order of the respective document identifiers of the ranked documents.

3. The method of claim 1, further comprising storing, for each identifier of a document in the first portion of the posting list relevance attributes of the document.

4. The method of claim 3, wherein the relevance attributes include at least one of the following: a total number of occurrences of the phrase in the document, a rank ordered list of anchor documents that also contain the phrase and that point to the document, a position of each phrase occurrence in the document, a set of one or more flags indicating a format of the occurrence or a portion of the document containing the occurrence.

5. The method of claim 1, wherein storing the first portion in the primary index includes storing the first portion on a primary server, and wherein storing the second portion in the secondary index, includes storing the first portion on a secondary server that is different from the primary server.

6. The method of claim 1, further comprising:
receiving a query that relates to the phrase;
determining a result using the primary index and not the secondary index;
determining the result includes a sufficient set; and
ranking the documents in the result.

7. A non-transitory computer-readable storage medium storing a computer program executable by at least one processor for indexing documents, actions of the computer program comprising:
determining a set of documents related to a first phrase;
determining a relevance score for each of the documents in the set, the relevance score for a document indicating the document's relevance to the first phrase;

partitioning the set of documents by the relevance scores into at least a first sub-set and a second sub-set, the first sub-set having relevance scores higher than the second sub-set;

generating a posting list for the first phrase partitioned across at least two tiers, the posting list comprising document entries that include a document identifier and the relevance score for the document, wherein a first tier stores document entries from the first sub-set and a second tier stores document entries from the second sub-set;

repeating the determining, partitioning, and generating for a second phrase; and storing the posting lists in an index.

8. The computer-readable storage medium of claim 7, wherein the relevance score includes a page rank-based score.

9. The computer-readable storage medium of claim 7, wherein the posting lists of the index are distributed amongst a plurality of computing devices by a hash of a phrase for the posting list.

10. A computer based method executed by one or more processors, the method comprising:

receiving a search query, which includes at least a first phrase and a second phrase, at a server that is in communication with an index server system storing a plurality of posting lists, at least some of the posting lists being associated with a phrase and including document identifiers for documents containing the phrase, and wherein the document identifiers in at least some posting lists are partitioned based on a relevance score that indicates a respective document's relevance to the phrase of the posting list, such that a first portion of the posting list contains document identifiers of documents with a higher relevance score than documents identified in a second portion of the posting list;

responsive to the first phrase having a partitioned posting list and the second phrase having a partitioned posting list, intersecting the first portion of the posting list of the first phrase with the first portion of the posting list of the second phrase;

determining that the intersection includes a sufficient result set; and ranking the documents in the result set.

11. The computer based method of claim 10, further comprising:

determining that the intersection fails to include a sufficient result set; and intersecting the second portion of the posting list for the first phrase with the first portion of the posting list for the second phrase; and including the intersection of the second portion and the first portion in the result set.

12. The computer based method of claim 10, wherein the first portion has a maximum quantity of document identifiers and the second portion has a remainder of the document identifiers.

13. The computer based method of claim 12, wherein when a quantity of document identifiers in a posting list fails to meet the maximum, the posting list is not partitioned.

14. The method of claim 10, wherein the intersection occurs without accessing the second portion of the posting list of the first phrase or the second portion of the posting list of the second phrase.

15. The method of claim 10, wherein the posting lists are distributed intersection occurs without accessing the second portion of the posting list of the first phrase or the second portion of the posting list of the second phrase.

* * * * *